United States Patent
Reid et al.

(10) Patent No.: US 10,834,914 B2
(45) Date of Patent: Nov. 17, 2020

(54) PEST CONTROL SYSTEM AND ASSOCIATED METHOD

(71) Applicant: Bayer AG, Leverkusen (DE)

(72) Inventors: Byron Reid, Raleigh, NC (US); Volker Gutsmann, Langenfeld (DE); Michael Zimmermann, Raleigh, NC (US); Chris Pienaar, Chapel Hill, NC (US); Gaelle Fages, Chapel Hill, NC (US); Peter Jardine, Wake Forest, NC (US)

(73) Assignee: Bayer AG, Leverkusen (DE)

( * ) Notice: Subject to any disclaimer, the term of this patent is extended or adjusted under 35 U.S.C. 154(b) by 766 days.

(21) Appl. No.: 15/485,820

(22) Filed: Apr. 12, 2017

(65) Prior Publication Data
US 2018/0295831 A1    Oct. 18, 2018

(51) Int. Cl.
*A01M 1/02*    (2006.01)

(52) U.S. Cl.
CPC .................. *A01M 1/026* (2013.01)

(58) Field of Classification Search
CPC ...... A01M 1/026; A01M 1/20; A01M 1/2005; A01M 25/00
See application file for complete search history.

(56) References Cited

U.S. PATENT DOCUMENTS

| | | |
|---|---|---|
| 4,862,145 A | 8/1989 | Meehan et al. |
| 4,937,555 A | 6/1990 | Litzkow et al. |
| 5,005,416 A | 4/1991 | Vick et al. |
| 5,040,326 A | 8/1991 | Van Dijnsen et al. |
| 5,473,942 A | 12/1995 | Vick et al. |
| 5,571,967 A | 11/1996 | Tanaka et al. |
| 5,646,404 A | 7/1997 | Litzkow et al. |
| 5,815,090 A | 9/1998 | Su |
| 6,052,066 A | 4/2000 | Su |
| 6,055,766 A | 5/2000 | Nolen et al. |
| 6,150,944 A | 11/2000 | Martin et al. |
| 6,339,897 B1 | 1/2002 | Hayes et al. |
| 6,385,544 B1 | 5/2002 | Mafra-Neto |
| 6,445,301 B1 | 9/2002 | Farrell et al. |

(Continued)

FOREIGN PATENT DOCUMENTS

| | | |
|---|---|---|
| EP | 1595452 A1 | 11/2005 |
| WO | 2014125158 A1 | 8/2014 |
| WO | 2017011916 A1 | 1/2017 |

*Primary Examiner* — Jessica B Wong
(74) *Attorney, Agent, or Firm* — McBee Moore & Vanik IP, LLC

(57) ABSTRACT

A pest monitoring system and associated method includes pest monitoring devices for placement at a site and generating a signal upon detection of a pest, and a pesticide dispensing unit including a reservoir housing a diluent and a pesticide module housing a pesticide. A computer device remotely disposed to the pest monitoring devices receives generated signals therefrom, analyzes environmental and historical factor data for the site to determine an amount and placement location of the pest monitoring devices for monitoring the site, and directs deployment of the pest control monitoring devices according to the analysis. The computer device also receives data from the pesticide dispensing unit including an amount or rate of the pesticide substance dispensed from the pesticide module, to form treatment having a concentration of the pesticide substance in the diluent, the treatment being dispensed from the pesticide dispensing unit to treat a detected pest at the site.

98 Claims, 11 Drawing Sheets

(56) References Cited

U.S. PATENT DOCUMENTS

| | | |
|---|---|---|
| 6,493,363 B1 | 12/2002 | Shuman et al. |
| 6,653,971 B1 | 11/2003 | Guice |
| 6,669,105 B2 | 12/2003 | Bryan et al. |
| 6,766,251 B2 | 7/2004 | Mafra-Neto et al. |
| 6,775,946 B2 | 8/2004 | Wright et al. |
| 6,792,395 B2 | 9/2004 | Roberts et al. |
| 6,882,279 B2 | 4/2005 | Shuman et al. |
| 6,923,064 B2 | 8/2005 | Rodriguez et al. |
| 6,926,211 B2 | 8/2005 | Bryan et al. |
| 6,937,156 B2 | 8/2005 | Gardner et al. |
| 6,947,810 B2 | 9/2005 | Skinner et al. |
| 7,020,996 B2 | 4/2006 | Beroza et al. |
| 7,026,924 B2 | 4/2006 | Degrauwe et al. |
| 7,026,942 B2 | 4/2006 | Cristofori et al. |
| 7,066,218 B1 | 6/2006 | Fleming et al. |
| 7,069,188 B2 | 6/2006 | Roberts |
| 7,071,829 B2 | 7/2006 | Gardner et al. |
| 7,090,147 B2 | 8/2006 | Lovett |
| 7,212,112 B2 | 5/2007 | Barber et al. |
| 7,218,234 B2 | 5/2007 | Tirkel et al. |
| 7,271,706 B2 | 9/2007 | Lee et al. |
| 7,286,056 B2 | 10/2007 | Kates |
| 7,295,898 B2 | 11/2007 | Lovett et al. |
| 7,317,399 B2 | 1/2008 | Chyun et al. |
| 7,395,161 B2 | 7/2008 | David et al. |
| 7,496,228 B2 | 2/2009 | Landwehr et al. |
| 7,504,956 B2 | 3/2009 | Kates |
| 7,506,547 B2 | 3/2009 | Jesmonth |
| 7,509,770 B2 | 3/2009 | Gardner et al. |
| 7,530,195 B2 | 5/2009 | Mueller et al. |
| 7,540,433 B2 | 6/2009 | Fleming et al. |
| 7,656,300 B2 | 2/2010 | Roennau |
| 7,916,951 B2 | 3/2011 | Landwehr et al. |
| 8,026,822 B2 | 9/2011 | Borth et al. |
| 8,078,711 B2 | 12/2011 | Jiang et al. |
| 8,139,858 B1 | 3/2012 | Landwehr et al. |
| 8,156,683 B2 | 4/2012 | Slotnick et al. |
| 8,258,966 B2 | 9/2012 | Wright et al. |
| 8,365,995 B2 | 2/2013 | Jiang et al. |
| 8,400,348 B1 | 3/2013 | Guice et al. |
| 8,417,534 B2 | 4/2013 | Belzer et al. |
| 8,448,377 B1 | 5/2013 | Price, III et al. |
| 8,504,234 B2 | 8/2013 | Anderson |
| 8,599,026 B2 | 12/2013 | Lloyd et al. |
| 8,635,806 B2 | 1/2014 | Gardner et al. |
| 8,830,071 B2 | 9/2014 | Borth et al. |
| 8,872,666 B2 | 10/2014 | Klute |
| 8,896,452 B2 | 11/2014 | Oppenheimer et al. |
| 8,984,804 B2 | 3/2015 | Borth |
| 8,994,529 B2 | 3/2015 | White |
| 9,015,987 B2 | 4/2015 | Moran et al. |
| 9,179,665 B2 | 11/2015 | Frojmovics |
| 9,357,759 B2 | 6/2016 | Anderson |
| 9,357,760 B2 | 6/2016 | Anderson |
| 9,380,775 B2 | 7/2016 | Frojmovics |
| 2002/0107639 A1 | 8/2002 | Mafra-Neto |
| 2002/0144452 A1 | 10/2002 | Beroza |
| 2003/0160699 A1 | 8/2003 | Trompen et al. |
| 2004/0216364 A1 | 11/2004 | Gosselin et al. |
| 2005/0125260 A1 | 6/2005 | Green et al. |
| 2005/0151653 A1 | 7/2005 | Chan et al. |
| 2006/0265941 A1 | 11/2006 | Newton |
| 2007/0193109 A1 | 8/2007 | Chyun |
| 2008/0092431 A1 | 4/2008 | Fritzboger |
| 2008/0204253 A1 | 8/2008 | Cottee et al. |
| 2008/0236023 A1 | 10/2008 | Thomas et al. |
| 2010/0115826 A1 | 5/2010 | Kerr |
| 2010/0286003 A1 | 11/2010 | Al-Ahmad |
| 2013/0047497 A1 | 2/2013 | White |
| 2013/0204581 A1 | 8/2013 | Park et al. |
| 2013/0293710 A1 | 11/2013 | Afanasyev et al. |
| 2013/0342344 A1 | 12/2013 | Kramer et al. |
| 2014/0085100 A1 | 3/2014 | Rich et al. |
| 2014/0279600 A1 | 9/2014 | Chait |
| 2014/0283435 A1 | 9/2014 | Galeb |
| 2014/0300477 A1 | 10/2014 | Rich et al. |
| 2014/0325892 A1 | 11/2014 | Borth et al. |
| 2014/0331544 A1 | 11/2014 | Azzarello, Jr. et al. |
| 2015/0150236 A1 | 6/2015 | Grant |
| 2015/0157003 A1 | 6/2015 | White et al. |
| 2015/0208636 A1 | 6/2015 | David et al. |
| 2015/0216158 A1 | 8/2015 | Mizrach et al. |
| 2016/0016128 A1 | 1/2016 | Cink et al. |
| 2016/0021867 A1 | 1/2016 | Frojmovics |
| 2016/0025652 A1 | 1/2016 | Go et al. |
| 2016/0070010 A1 | 3/2016 | Calupca et al. |
| 2016/0150744 A1 | 6/2016 | Lin et al. |
| 2016/0023873 A1 | 8/2016 | Janet et al. |
| 2016/0219858 A1 | 8/2016 | Cink et al. |
| 2016/0235050 A1 | 8/2016 | Janet et al. |

|  | Low environmental factor data | High environmental factor data |
|---|---|---|
| High historical factor data | $bX$ pest monitors per linear foot, $b>1$ | $cX$ pest monitors per linear foot, $c>a$ and $c>b$ |
| Low historical factor data | $X$ pest monitors per linear foot | $aX$ pest monitors per linear foot, $a>1$ |

FIG. 3

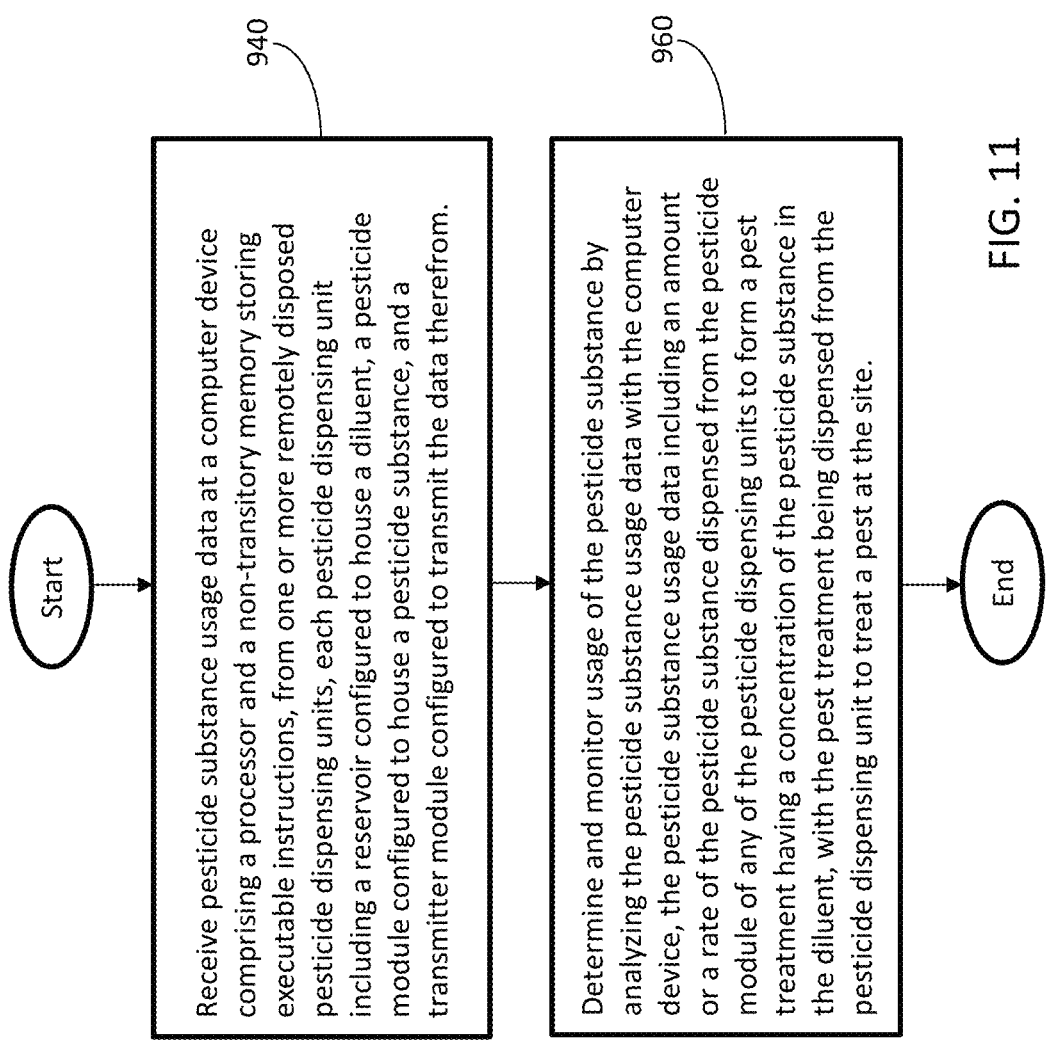

PEST CONTROL SYSTEM AND ASSOCIATED METHOD

BACKGROUND OF THE DISCLOSURE

Field of the Disclosure

The present disclosure is directed to pest detection, control, and management and, more particularly to a pest control system and method involving centralized pest monitoring and detection, pest identification/infestation source analysis and treatment recommendations, and analytics and inventory control, thereby providing a comprehensive and centrally-driven pest management environment.

Description of Related Art

Distributed pest detection networks, including a central station in communication with one or more distributed pest detectors or traps, are known in the art. However, such distributed pest networks are often very rudimentary, often only signaling to the central station that some unidentified organism has sufficiently interacted with the detector/trap to send a detection signal back to the central station. Once the detection signal is received at the central station, a pest control technician is often dispatched to the site, often with no indication as to the nature of the detected organism, what treatment must be applied to address the detected organism, or what steps must be taken to prevent future occurrences. In addition, there may be little or no information or indicators as to the root cause of the pest issue, and forecasting or predicting the likelihood of future trends in pest activity may just be guesswork.

Another issue related to pest control is the application of treatments, particularly chemical pesticide treatments that must be mixed in a particular concentration in a diluent in order to be applied per manufacturer recommendations. Often, mixing the pesticide treatment from the pesticide substance (active ingredient) and the diluent may also be guesswork, or a rough approximation at best, with the pest control technician often erring on the side of adding a higher concentration of the pesticide substance to the diluent, unless the pesticide substance and the diluent are provided in precisely measured quantities. Accordingly, the application of the pesticide treatment likely uses more of the pesticide substance than necessary, may often be inconsistent between applications, and may not be in the appropriate concentration for optimum efficacy. This, in turn, may lead to inventory issues for the manufacturer/distributors providing the pesticide substance, as well as cost inefficiency on the part of the pest control organization (PCO) handling the pest control issues.

Thus, there exists a need for a more efficient pest monitoring and control system for streamlining the process of monitoring a site for pest infestation issues and effectively, efficiently, and expediently treating any detected pest problems. Moreover, there exists a need for a pesticide application system which is more efficient in providing the appropriate pesticide treatment involving a concentration of a pesticide substance in a diluent, and for improving the consistency, efficacy, and efficiency of the application process for the pesticide treatment.

SUMMARY

The above and other needs are met by aspects of the present disclosure which, in one aspect, provides a pest monitoring and control system, comprising a plurality of pest monitoring devices each configured for placement at a site and to generate a signal in response to detection of a pest at the site. A computer device remotely disposed with respect to the pest monitoring devices, is configured to be in communication with the pest monitoring devices so as to receive the generated signals therefrom, the signals from the pest monitoring devices comprising actual site data. The computer device is further configured to analyze environmental factor data and historical factor data to determine an amount of the pest monitoring devices suggested for monitoring the site and a placement location about the site for each of the pest monitoring devices, wherein the environmental factor data is associated with environmental factors of and about the site conducive to pest population development, and the historical factor data is associated with factors indicative of historic pest populations at the site. The computer device is also configured to direct deployment of the pest control monitoring devices about the site according to the analysis.

Another aspect of the present disclosure provides a pesticide application system, comprising one or more pesticide dispensing/application units, each pesticide dispensing/application unit including a reservoir configured to house a diluent, a pesticide module configured to house a pesticide substance, and a transmitter module configured to transmit data from the pesticide dispensing/application unit. A computer device remotely disposed with respect to the pesticide dispensing/application units, is configured to receive data from the pesticide dispensing/application units via the respective transmitter module. The data includes an amount or a rate of the pesticide substance dispensed from the pesticide module of any of the pesticide dispensing/application units, to form a pest treatment having a concentration of the pesticide substance in the diluent, wherein the pest treatment is dispensed from the pesticide dispensing/application unit to treat a pest.

The present disclosure thus includes, without limitation, the following aspects:

Aspect 1: A pest monitoring and control system, comprising a plurality of pest monitoring devices each configured for placement at a site and to generate a signal in response to detection of a pest at the site; and a computer device remotely disposed with respect to the pest monitoring devices and configured to be in communication therewith so as to receive the generated signals therefrom, the signals from the pest monitoring devices comprising actual site data, wherein the computer device comprises a processor and a non-transitory memory storing executable instructions that, in response to execution by the processor, cause the computer device to at least analyze environmental factor data and historical factor data to determine an amount of the pest monitoring devices suggested for monitoring the site and a placement location about the site for each of the pest monitoring devices, the environmental factor data being associated with environmental factors of and about the site conducive to pest population development, and the historical factor data being associated with factors indicative of historic pest populations at the site; and direct deployment of the pest control monitoring devices about the site according to the analysis.

Aspect 2: The system of any preceding or subsequent aspect, or combinations thereof, wherein, in response to detection of a pest by any of the pest monitoring devices, the computer device is configured to analyze the actual site data to determine a location or a potential source of the detected pest about the site.

Aspect 3: The system of any preceding or subsequent aspect, or combinations thereof, wherein, in response to detection of a pest by any of the pest monitoring devices, the computer device is configured to analyze the actual site data to determine a vector indicating the location or the potential source of the detected pest about the site.

Aspect 4: The system of any preceding or subsequent aspect, or combinations thereof, wherein the computer device is configured to analyze the actual site data with the environmental factor data and the historical factor data to determine whether the placement location of the pest monitoring devices about the site should be altered or whether the amount of the pest monitoring devices deployed about the site should be altered.

Aspect 5: The system of any preceding or subsequent aspect, or combinations thereof, wherein the computer device is configured to direct modulation of at least the amount of pest monitoring devices deployed about the site based on a risk tolerance factor.

Aspect 6: The system of any preceding or subsequent aspect, or combinations thereof, wherein the computer device is configured to analyzing the environmental factor data and the historical factor data to determine the amount of pest monitoring devices suggested for monitoring the site and the placement location about the site for each of the pest monitoring devices with respect to a geospatial map of the site.

Aspect 7: The system of any preceding or subsequent aspect, or combinations thereof, wherein the computer device is configured to designate a remedy for the detected pest or the potential source thereof at the site.

Aspect 8: The system of any preceding or subsequent aspect, or combinations thereof, wherein the computer device is configured to direct one or more identification inquiries to a remote terminal in response to the actual site data, the remote terminal being configured to receive responses to the one or more identification inquiries input therein from the site and to direct the responses to the computer device, the computer device being responsive to the responses from the remote terminal to identify the detected pest and designate a remedy for the detected pest or the source thereof at the site.

Aspect 9: The system of any preceding or subsequent aspect, or combinations thereof, wherein the computer device is configured to direct a remedy for the detected pest or the potential source thereof at the site to a pesticide dispenser configured to effectuate the remedy at the site or to a pest control technician directed to effectuate the remedy at the site.

Aspect 10: The system of any preceding or subsequent aspect, or combinations thereof, wherein the computer device is configured to analyze the actual site data in comparison to operational activity data associated with operational activity factors at the site or external environmental factor data associated with external environmental factors affecting the site, to forecast a future pest infestation event.

Aspect 11: The system of any preceding or subsequent aspect, or combinations thereof, wherein the computer device is configured to determine changes in operational activity factors associated with the operational activity data, changes in environmental factors associated with the environmental factor data, or preventative factors for counteracting the forecasted future pest infestation event.

Aspect 12: The system of any preceding or subsequent aspect, or combinations thereof, wherein the computer device is configured to analyze data from environmental monitors associated with the site, physical factors data associated with the site, data from facility monitors associated with the site, or data associated with operation factors associated with the site, to determine any correlation thereof with the actual site data so as to identify a root cause of a pest infestation at the site or recommend measures for preventing a future pest infestation.

Aspect 13: The system of any preceding or subsequent aspect, or combinations thereof, wherein the computer device is configured to vary the designated remedy or an active ingredient of the designated remedy for the detected pest or the potential source thereof at the site so as to prevent or delay development of resistance to the remedy or the active ingredient of the designated remedy by the detected pest.

Aspect 14: The system of any preceding or subsequent aspect, or combinations thereof, wherein the computer device is configured to correlate actual site data with the designated remedy for the detected pest or the source thereof at the site so as to determine any change in pest activity in response to the designated remedy or to rate effectiveness of the designated remedy according to the pest activity being treated.

Aspect 15: The system of any preceding or subsequent aspect, or combinations thereof, wherein the computer device is configured to analyze the actual site data to determine whether pest activity associated therewith is increasing, in relation the designated remedy or effectuation parameters associated therewith, to recommend further remedial action and wherein the further remedial action includes adjusting the effectuation parameters within a recommended range, addressing site factors not associated with the effectuation parameters, and altering the designated remedy so as to prevent or delay development of resistance to the remedy or an active ingredient of the designated remedy by the detected pest.

Aspect 16: The system of any preceding or subsequent aspect, or combinations thereof, wherein the computer device is configured to compare the designated remedy to remedy restrictions for the site, and to designate an alternate remedy if the designated remedy conflicts with the remedy restrictions.

Aspect 17: A method of pest monitoring and control at a site, comprising analyzing environmental factor data and historical factor data to determine an amount of pest monitoring devices suggested for monitoring the site and a placement location about the site for each of the pest monitoring devices, the environmental factor data being associated with environmental factors of and about the site conducive to pest population development, and the historical factor data being associated with factors indicative of historic pest populations at the site; and deploying the pest control monitoring devices about the site according to the analysis.

Aspect 18: The method of any preceding or subsequent aspect, or combinations thereof, wherein each pest monitoring device is configured to generate a signal in response to detection of a pest at the site and to transmit the signal to a remotely-disposed computer device, and wherein the method comprises analyzing the signals from any of the pest monitoring devices using the computer device to determine a location or a potential source of the detected pest about the site, the signals from the pest monitoring devices comprising actual site data.

Aspect 19: The method of any preceding or subsequent aspect, or combinations thereof, comprising analyzing the actual site data to determine a vector indicating the location or the potential source of the detected pest about the site.

Aspect 20: The method of any preceding or subsequent aspect, or combinations thereof, comprising analyzing the actual site data with the environmental factor data and the historical factor data to determine whether the placement location of the pest monitoring devices about the site should be altered or whether the amount of the pest monitoring devices deployed about the site should be altered.

Aspect 21: The method of any preceding or subsequent aspect, or combinations thereof, comprising directing modulation of at least the amount of pest monitoring devices deployed about the site based on a risk tolerance factor.

Aspect 22: The method of any preceding or subsequent aspect, or combinations thereof, wherein analyzing the environmental factor data and the historical factor data to determine the amount of pest monitoring devices suggested for monitoring the site and the placement location about the site for each of the pest monitoring devices is performed with respect to a geospatial map of the site.

Aspect 23: The method of any preceding or subsequent aspect, or combinations thereof, comprising designating, by the computer device, a remedy for the detected pest or the potential source thereof at the site.

Aspect 24: The method of any preceding or subsequent aspect, or combinations thereof, comprising directing one or more identification inquiries from the computer device to a remote terminal in response to the actual site data, the remote terminal being configured to receive responses to the one or more identification inquiries input therein from the site.

Aspect 25: The method of any preceding or subsequent aspect, or combinations thereof, comprising receiving the responses at the computer device, the computer device being responsive to the responses from the remote terminal to identify the detected pest, and designating, by the computer device, a remedy for the detected pest or the source thereof at the site.

Aspect 26: The method of any preceding or subsequent aspect, or combinations thereof, comprising directing a remedy for the detected pest or the potential source thereof at the site from the computer device to a pesticide dispenser configured to effectuate the remedy at the site or to a pest control technician directed to effectuate the remedy at the site.

Aspect 27: The method of any preceding or subsequent aspect, or combinations thereof, comprising forecasting a future pest infestation event by analyzing, with the computer device, the actual site data in comparison to operational activity data associated with operational activity factors at the site or external environmental factor data associated with external environmental factors affecting the site.

Aspect 28: The method of any preceding or subsequent aspect, or combinations thereof, comprising determining, with the computer device, changes in operational activity factors associated with the operational activity data, changes in environmental factors associated with the environmental factor data, or preventative factors for counteracting the forecasted future pest infestation event.

Aspect 29: The method of any preceding or subsequent aspect, or combinations thereof, comprising identifying a root cause of a pest infestation at the site or recommending measures for preventing a future pest infestation, with the computer device, by analyzing data from environmental monitors associated with the site, physical factors data associated with the site, data from facility monitors associated with the site, or data associated with operation factors associated with the site, to determine any correlation thereof with the actual site data.

Aspect 30: The method of any preceding or subsequent aspect, or combinations thereof, comprising preventing or delaying development of resistance to the remedy or an active ingredient of the designated remedy by the detected pest by varying, with the computer device, the designated remedy or the active ingredient of the designated remedy for the detected pest or the potential source thereof at the site.

Aspect 31: The method of any preceding or subsequent aspect, or combinations thereof, comprising correlating, with the computer device, actual site data with the designated remedy for the detected pest or the source thereof at the site so as to determine any change in pest activity in response to the designated remedy or to rate effectiveness of the designated remedy according to the pest activity being treated.

Aspect 32: The method of any preceding or subsequent aspect, or combinations thereof, comprising recommending further remedial action by analyzing the actual site data, with the computer device, to determine whether pest activity associated therewith is increasing, in relation the designated remedy or effectuation parameters associated therewith, wherein the further remedial action includes adjusting the effectuation parameters within a recommended range, addressing site factors not associated with the effectuation parameters, and altering the designated remedy so as to prevent or delay development of resistance to the remedy or an active ingredient of the designated remedy by the detected pest.

Aspect 33: The method of any preceding or subsequent aspect, or combinations thereof, comprising comparing, with the computer device, the designated remedy to remedy restrictions for the site, and designating an alternate remedy if the designated remedy conflicts with the remedy restrictions.

Aspect 34: A computer-readable storage medium for a pest control monitoring and control system at a site, the computer-readable storage medium being non-transitory and having computer-readable program code stored therein that, in response to execution by a processor, causes an apparatus to at least analyze environmental factor data and historical factor data to determine an amount of pest monitoring devices suggested for monitoring the site and a placement location about the site for each of the pest monitoring devices, the environmental factor data being associated with environmental factors of the site conducive to pest population development, and the historical factor data being associated with factors indicative of historic pest populations at the site; and deploy the pest control monitoring devices about the site according to the analysis.

Aspect 35: The non-transitory computer-readable storage medium of any preceding or subsequent aspect, or combinations thereof, wherein each pest monitoring device is configured to generate a signal in response to detection of a pest at the site and to transmit the signal to a remotely-disposed computer device having the non-transitory computer-readable storage medium associated therewith, and wherein the non-transitory computer-readable storage medium includes further computer-readable program code stored therein that in response to execution by the processor, causes the apparatus to analyze the signals from the pest monitoring devices to determine a location or a potential source of the detected pest about the site, the signals from the pest monitoring devices comprising actual site data.

Aspect 36: The non-transitory computer-readable storage medium of any preceding or subsequent aspect, or combinations thereof, including further computer-readable program code stored therein that in response to execution by the processor, causes the apparatus to analyze the actual site data to determine a vector indicating the location or the potential source of the detected pest about the site.

Aspect 37: The non-transitory computer-readable storage medium of any preceding or subsequent aspect, or combinations thereof, including further computer-readable program code stored therein that in response to execution by the processor, causes the apparatus to analyze the actual site data with the environmental factor data and the historical factor data to determine whether the placement location of the pest monitoring devices about the site should be altered or whether the amount of the pest monitoring devices deployed about the site should be altered.

Aspect 38: The non-transitory computer-readable storage medium of any preceding or subsequent aspect, or combinations thereof, including further computer-readable program code stored therein that in response to execution by the processor, causes the apparatus to direct modulation of at least the amount of pest monitoring devices deployed about the site based on a risk tolerance factor.

Aspect 39: The non-transitory computer-readable storage medium of any preceding or subsequent aspect, or combinations thereof, including further computer-readable program code stored therein that in response to execution by the processor, causes the apparatus to analyze the environmental factor data and the historical factor data to determine the amount of pest monitoring devices suggested for monitoring the site and the placement location about the site for each of the pest monitoring devices with respect to a geospatial map of the site.

Aspect 40: The non-transitory computer-readable storage medium of any preceding or subsequent aspect, or combinations thereof, including further computer-readable program code stored therein that in response to execution by the processor, causes the apparatus to designate a remedy for the detected pest or the potential source thereof at the site.

Aspect 41: The non-transitory computer-readable storage medium of any preceding or subsequent aspect, or combinations thereof, including further computer-readable program code stored therein that in response to execution by the processor, causes the apparatus to direct one or more identification inquiries from the computer device to a remote terminal in response to the actual site data, the remote terminal being configured to receive responses to the one or more identification inquiries input therein from the site.

Aspect 42: The non-transitory computer-readable storage medium of any preceding or subsequent aspect, or combinations thereof, including further computer-readable program code stored therein that in response to execution by the processor, causes the apparatus, in response to receipt of the responses from the remote terminal, to identify the detected pest, and designate a remedy for the detected pest or the source thereof at the site.

Aspect 43: The non-transitory computer-readable storage medium of any preceding or subsequent aspect, or combinations thereof, including further computer-readable program code stored therein that in response to execution by the processor, causes the apparatus to direct a remedy for the detected pest or the potential source thereof at the site from the computer device to a pesticide dispenser configured to effectuate the remedy at the site or to a pest control technician directed to effectuate the remedy at the site.

Aspect 44: The non-transitory computer-readable storage medium of any preceding or subsequent aspect, or combinations thereof, including further computer-readable program code stored therein that in response to execution by the processor, causes the apparatus to forecast a future pest infestation event by analyzing the actual site data in comparison to operational activity data associated with operational activity factors at the site or external environmental factor data associated with external environmental factors affecting the site.

Aspect 45: The non-transitory computer-readable storage medium of any preceding or subsequent aspect, or combinations thereof, including further computer-readable program code stored therein that in response to execution by the processor, causes the apparatus to determine changes in operational activity factors associated with the operational activity data, changes in environmental factors associated with the environmental factor data, or preventative factors for counteracting the forecasted future pest infestation event.

Aspect 46: The non-transitory computer-readable storage medium of any preceding or subsequent aspect, or combinations thereof, including further computer-readable program code stored therein that in response to execution by the processor, causes the apparatus to identify a root cause of a pest infestation at the site or recommend measures for preventing a future pest infestation, by analyzing data from environmental monitors associated with the site, physical factors data associated with the site, data from facility monitors associated with the site, or data associated with operation factors associated with the site, to determine any correlation thereof with the actual site data.

Aspect 47: The non-transitory computer-readable storage medium of any preceding or subsequent aspect, or combinations thereof, including further computer-readable program code stored therein that in response to execution by the processor, causes the apparatus to prevent or delay development of resistance to the remedy by the detected pest by varying the designated remedy or an active ingredient of the designated remedy for the detected pest or the potential source thereof at the site.

Aspect 48: The non-transitory computer-readable storage medium of any preceding or subsequent aspect, or combinations thereof, including further computer-readable program code stored therein that in response to execution by the processor, causes the apparatus to correlate actual site data with the designated remedy for the detected pest or the source thereof at the site so as to determine any change in pest activity in response to the designated remedy or to rate effectiveness of the designated remedy according to the pest activity being treated.

Aspect 49: The non-transitory computer-readable storage medium of any preceding or subsequent aspect, or combinations thereof, including further computer-readable program code stored therein that in response to execution by the processor, causes the apparatus to recommend further remedial action by analyzing the actual site data to determine whether pest activity associated therewith is increasing, in relation the designated remedy or effectuation parameters associated therewith, wherein the further remedial action includes adjusting the effectuation parameters within a recommended range, addressing site factors not associated with the effectuation parameters, and altering the designated remedy so as to prevent or delay development of resistance to the remedy or an active ingredient of the designated remedy by the detected pest.

Aspect 50: The non-transitory computer-readable storage medium of any preceding or subsequent aspect, or combinations thereof, including further computer-readable program code stored therein that in response to execution by the processor, causes the apparatus to compare the designated remedy to remedy restrictions for the site, and designate an alternate remedy if the designated remedy conflicts with the remedy restrictions.

Aspect 51: A pesticide application system, comprising one or more pesticide dispensing units, each pesticide dispensing unit including a reservoir configured to house a diluent, a pesticide module configured to house a pesticide substance, and a transmitter module configured to transmit data therefrom; and a computer device remotely disposed with respect to the pesticide dispensing units and configured to receive pesticide substance usage data therefrom via the respective transmitter module, the pesticide substance usage data including an amount or a rate of the pesticide substance dispensed from the pesticide module of any of the pesticide dispensing units to form a pest treatment having a concentration of the pesticide substance in the diluent, the pest treatment being dispensed from the pesticide dispensing unit to treat a pest at the site, and the computer device comprising a processor and a non-transitory memory storing executable instructions that, in response to execution by the processor, cause the computer device to at least determine and monitor usage of the pesticide substance.

Aspect 52: The system of any preceding or subsequent aspect, or combinations thereof, wherein the one or more pesticide dispensing units comprises a plurality of pesticide dispensing units, and wherein the computer device is configured to determine usage of the pesticide substance based on the amount or the rate thereof dispensed from the pesticide modules of the pesticide dispensing units.

Aspect 53: The system of any preceding or subsequent aspect, or combinations thereof, wherein the computer device is configured to determine a normal usage distribution statistic for the pesticide substance dispensed from one or more of the pesticide dispensing units.

Aspect 54: The system of any preceding or subsequent aspect, or combinations thereof, wherein the computer device is configured to compare the determined usage of the pesticide substance from any of the pesticide dispensing units to the normal usage distribution statistic to determine any of the pesticide dispensing units dispensing more than or less than the normal usage distribution statistic for the pesticide substance.

Aspect 55: The system of any preceding or subsequent aspect, or combinations thereof, wherein each pesticide dispensing unit is associated with a pest control technician, and wherein, in response to the determined usage of the pesticide substance from any of the pesticide dispensing units being outside the normal usage distribution statistic, the computer device is configured to determine remedial pesticide application training for the pest control technician.

Aspect 56: The system of any preceding or subsequent aspect, or combinations thereof, wherein the one or more pesticide dispensing units each comprise a timer module in communication with the transmitter module, the timer module being configured to determine a duration of a pesticide application event, and wherein the computer device is configured to determine a normal duration distribution statistic for a plurality of the pesticide application events.

Aspect 57: The system of any preceding or subsequent aspect, or combinations thereof, wherein the computer device is configured to compare the determined duration of the pesticide application event from any of the pesticide dispensing units to the normal duration distribution statistic to determine any of the pesticide dispensing units being used for more than or less than the normal duration distribution statistic for the pesticide application events.

Aspect 58: The system of any preceding or subsequent aspect, or combinations thereof, wherein each pesticide dispensing unit is associated with a pest control technician, and wherein, in response to the determined duration of the pesticide application event from any of the pesticide dispensing units being outside the normal duration distribution statistic, the computer device is configured to determine and monitor remedial pesticide application training for the pest control technician.

Aspect 59: The system of any preceding or subsequent aspect, or combinations thereof, wherein the computer device is configured to correlate data from environmental monitors associated with the site, physical factors data associated with the site, data from facility monitors associated with the site, data associated with operation factors associated with the site, or external environmental factor data associated with external environmental factors affecting the site, with the determined usage of the pesticide substance.

Aspect 60: The system of any preceding or subsequent aspect, or combinations thereof, wherein the one or more pesticide dispensing units each comprise a receiver module configured to receive communications from the computer device, and wherein the computer device is configured to direct at least the pesticide module of any of the pesticide dispensing units to meter the pesticide substance dispensed therefrom for forming a specified concentration of the pesticide substance in the diluent of the pest treatment to be dispensed from the pesticide dispensing unit.

Aspect 61: The system of any preceding or subsequent aspect, or combinations thereof, wherein the computer device is configured to determine a weather forecast associated with the site, and to direct the pesticide dispensing unit to refrain from dispensing the pest treatment at the site, if the weather forecast includes a weather event contraindicating dispensation of the pest treatment.

Aspect 62: The system of any preceding or subsequent aspect, or combinations thereof, comprising a geospatial location module engaged with each of the one or more pesticide dispensing units, wherein the computer device is configured to correlate a location of the site with locations of the pesticide dispensing units determined from the respective geospatial location module, and to dispatch a pest control technician, associated with the pesticide dispensing unit closest to the location of the site, to the site to dispense the pest treatment.

Aspect 63: The system of any preceding or subsequent aspect, or combinations thereof, comprising a geospatial location module engaged with each of the one or more pesticide dispensing units, wherein the computer device is configured to determine the locations of the pesticide dispensing units from the respective geospatial location module, to compare the location of any one of the pesticide dispensing units to pest treatment restrictions for the location, and to designate an alternate pest treatment if the designated pest treatment conflicts with the pest treatment restrictions for the location.

Aspect 64: The system of any preceding or subsequent aspect, or combinations thereof, wherein the pesticide module is configured to monitor consumption of the pesticide substance housed thereby and to transmit associated consumption data to the computer device via the transmitter module, and wherein the computer device is configured to analyze the consumption data to determine a usage rate for the pesticide substance in the pesticide module, an ordering interval for a replacement pesticide module to replace the pesticide module upon depletion of the pesticide substance housed thereby, a retrieving interval for retrieving the pesticide module upon depletion of the pesticide substance housed thereby, or an inventory level of the pesticide modules required to provide expedient replacement of the pesticide module upon depletion of the pesticide substance housed thereby.

Aspect 65: The system of any preceding or subsequent aspect, or combinations thereof, wherein the computer device is configured to compare the consumption data to an inventory of pesticide modules housing the pesticide substance and pesticide modules depleted of the pesticide substance, to generate audit data.

Aspect 66: The system of any preceding or subsequent aspect, or combinations thereof, wherein the computer device is configured to determine supply chain information associated with the pesticide module housing the pesticide substance, and to compare the supply chain information to pest detection information associated with the site to monitor pesticide substance product quality or pesticide substance performance metrics.

Aspect 67: A method of pesticide application at a site, comprising receiving pesticide substance usage data at a computer device comprising a processor and a non-transitory memory storing executable instructions, from one or more remotely disposed pesticide dispensing units, each pesticide dispensing unit including a reservoir configured to house a diluent, a pesticide module configured to house a pesticide substance, and a transmitter module configured to transmit the data therefrom; and determining and monitoring usage of the pesticide substance by analyzing the pesticide substance usage data with the computer device, the pesticide substance usage data including an amount or a rate of the pesticide substance dispensed from the pesticide module of any of the pesticide dispensing units to form a pest treatment having a concentration of the pesticide substance in the diluent, with the pest treatment being dispensed from the pesticide dispensing unit to treat a pest at the site.

Aspect 68: The method of any preceding or subsequent aspect, or combinations thereof, wherein the one or more pesticide dispensing units comprises a plurality of pesticide dispensing units, and wherein the method comprises determining usage of the pesticide substance based on the amount or the rate of the pesticide substance dispensed from the pesticide modules of the pesticide dispensing units.

Aspect 69: The method of any preceding or subsequent aspect, or combinations thereof, comprising determining a normal usage distribution statistic for the pesticide substance dispensed from one or more of the pesticide dispensing units.

Aspect 70: The method of any preceding or subsequent aspect, or combinations thereof, comprising comparing the determined usage of the pesticide substance from any of the pesticide dispensing units to the normal usage distribution statistic to determine any of the pesticide dispensing units dispensing more than or less than the normal usage distribution statistic for the pesticide substance.

Aspect 71: The method of any preceding or subsequent aspect, or combinations thereof, wherein each pesticide dispensing unit is associated with a pest control technician, and wherein the method comprises determining remedial pesticide application training for the pest control technician, in response to the determined usage of the pesticide substance from any of the pesticide dispensing units being outside the normal usage distribution statistic.

Aspect 72: The method of any preceding or subsequent aspect, or combinations thereof, wherein the one or more pesticide dispensing units each comprise a timer module in communication with the transmitter module, the timer module being configured to determine a duration of a pesticide application event, and wherein the method comprises determining a normal duration distribution statistic for a plurality of the pesticide application events.

Aspect 73: The method of any preceding or subsequent aspect, or combinations thereof, comprising comparing the determined duration of the pesticide application event from any of the pesticide dispensing units to the normal duration distribution statistic to determine any of the pesticide dispensing units being used for more than or less than the normal duration distribution statistic for the pesticide application events.

Aspect 74: The method of any preceding or subsequent aspect, or combinations thereof, wherein each pesticide dispensing unit is associated with a pest control technician, and wherein the method comprises determining and monitoring remedial pesticide application training for the pest control technician, in response to the determined duration of the pesticide application event from any of the pesticide dispensing units being outside the normal duration distribution statistic.

Aspect 75: The method of any preceding or subsequent aspect, or combinations thereof, comprising correlating data from environmental monitors associated with the site, physical factors data associated with the site, data from facility monitors associated with the site, data associated with operation factors associated with the site, or external environmental factor data associated with external environmental factors affecting the site, with the determined usage of the pesticide substance.

Aspect 76: The method of any preceding or subsequent aspect, or combinations thereof, wherein the one or more pesticide dispensing units each comprise a receiver module configured to receive communications from the computer device, and wherein the method comprises directing at least the pesticide module of any of the pesticide dispensing units to meter the pesticide substance dispensed therefrom for forming a specified concentration of the pesticide substance in the diluent of the pest treatment to be dispensed from the pesticide dispensing unit.

Aspect 77: The method of any preceding or subsequent aspect, or combinations thereof, comprising determining a weather forecast associated with the site, and directing the pesticide dispensing unit to refrain from dispensing the pest treatment at the site, if the weather forecast includes a weather event contraindicating dispensation of the pest treatment.

Aspect 78: The method of any preceding or subsequent aspect, or combinations thereof, comprising a geospatial location module engaged with each of the one or more pesticide dispensing units, wherein the method comprises correlating a location of the site with locations of the pesticide dispensing units determined from the respective geospatial location module, and dispatching a pest control technician, associated with the pesticide dispensing unit closest to the location of the site, to the site to dispense the pest treatment.

Aspect 79: The method of any preceding or subsequent aspect, or combinations thereof, comprising a geospatial location module engaged with each of the one or more pesticide dispensing units, wherein the method comprises determining the locations of the pesticide dispensing units from the respective geospatial location module, comparing the location of any one of the pesticide dispensing units to pest treatment restrictions for the location, and designating an alternate pest treatment if the designated pest treatment conflicts with the pest treatment restrictions for the location.

Aspect 80: The method of any preceding or subsequent aspect, or combinations thereof, wherein the pesticide module is configured to monitor consumption of the pesticide substance housed thereby and to transmit associated consumption data to the computer device via the transmitter module, and wherein the method comprises analyzing the consumption data to determine a usage rate for the pesticide substance in the pesticide module, an ordering interval for a replacement pesticide module to replace the pesticide module upon depletion of the pesticide substance housed thereby, a retrieving interval for retrieving the pesticide module upon depletion of the pesticide substance housed thereby, or an inventory level of the pesticide modules required to provide expedient replacement of the pesticide module upon depletion of the pesticide substance housed thereby.

Aspect 81: The method of any preceding or subsequent aspect, or combinations thereof, comprising comparing the consumption data to an inventory of pesticide modules housing the pesticide substance and pesticide modules depleted of the pesticide substance, to generate audit data.

Aspect 82: The method of any preceding or subsequent aspect, or combinations thereof, comprising determining supply chain information associated with the pesticide module housing the pesticide substance, and comparing the supply chain information to pest detection information associated with the site, to monitor pesticide substance product quality or pesticide substance performance metrics.

Aspect 83: A computer-readable storage medium for pesticide application at a site, the computer-readable storage medium being non-transitory and having computer-readable program code stored therein that, in response to execution by a processor, causes an apparatus to at least receive pesticide substance usage data at a computer device having the non-transitory computer-readable storage medium associated therewith, from one or more remotely disposed pesticide dispensing units, each pesticide dispensing unit including a reservoir configured to house a diluent, a pesticide module configured to house a pesticide substance, and a transmitter module configured to transmit the data therefrom; and determine and monitor usage of the pesticide substance by analyzing the pesticide substance usage data with the computer device, the pesticide substance usage data including an amount or a rate of the pesticide substance dispensed from the pesticide module of any of the pesticide dispensing units to form a pest treatment having a concentration of the pesticide substance in the diluent, with the pest treatment being dispensed from the pesticide dispensing unit to treat a pest at the site.

Aspect 84: The non-transitory computer-readable storage medium of any preceding or subsequent aspect, or combinations thereof, wherein the one or more pesticide dispensing units comprises a plurality of pesticide dispensing units, and wherein the non-transitory computer-readable storage medium includes further computer-readable program code stored therein that in response to execution by the processor, causes the apparatus to determine usage of the pesticide substance based on the amount or the rate of the pesticide substance dispensed from the pesticide modules of the pesticide dispensing units.

Aspect 85: The non-transitory computer-readable storage medium of any preceding or subsequent aspect, or combinations thereof, including further computer-readable program code stored therein that in response to execution by the processor, causes the apparatus to determine a normal usage distribution statistic for the pesticide substance dispensed from one or more of the pesticide dispensing units.

Aspect 86: The non-transitory computer-readable storage medium of any preceding or subsequent aspect, or combinations thereof, including further computer-readable program code stored therein that in response to execution by the processor, causes the apparatus to compare the determined usage of the pesticide substance from any of the pesticide dispensing units to the normal usage distribution statistic to determine any of the pesticide dispensing units dispensing more than or less than the normal usage distribution statistic for the pesticide substance.

Aspect 87: The non-transitory computer-readable storage medium of any preceding or subsequent aspect, or combinations thereof, wherein each pesticide dispensing unit is associated with a pest control technician, and wherein the non-transitory computer-readable storage medium includes further computer-readable program code stored therein that in response to execution by the processor, causes the apparatus to determine remedial pesticide application training for the pest control technician, in response to the determined usage of the pesticide substance from any of the pesticide dispensing units being outside the normal usage distribution statistic.

Aspect 88: The non-transitory computer-readable storage medium of any preceding or subsequent aspect, or combinations thereof, wherein the one or more pesticide dispensing units each comprise a timer module in communication with the transmitter module, the timer module being configured to determine a duration of a pesticide application event, and wherein the non-transitory computer-readable storage medium includes further computer-readable program code stored therein that in response to execution by the processor, causes the apparatus to determine a normal duration distribution statistic for a plurality of the pesticide application events.

Aspect 89: The non-transitory computer-readable storage medium of any preceding or subsequent aspect, or combinations thereof, including further computer-readable program code stored therein that in response to execution by the processor, causes the apparatus to compare the determined duration of the pesticide application event from any of the pesticide dispensing units to the normal duration distribution statistic to determine any of the pesticide dispensing units being used for more than or less than the normal duration distribution statistic for the pesticide application events.

Aspect 90: The non-transitory computer-readable storage medium of any preceding or subsequent aspect, or combinations thereof, wherein each pesticide dispensing unit is associated with a pest control technician, and wherein the non-transitory computer-readable storage medium includes further computer-readable program code stored therein that in response to execution by the processor, causes the apparatus to determine and monitor remedial pesticide application training for the pest control technician, in response to the determined duration of the pesticide application event from any of the pesticide dispensing units being outside the normal duration distribution statistic.

Aspect 91: The non-transitory computer-readable storage medium of any preceding or subsequent aspect, or combinations thereof, including further computer-readable program code stored therein that in response to execution by the processor, causes the apparatus to correlate data from environmental monitors associated with the site, physical factors data associated with the site, data from facility monitors associated with the site, data associated with operation factors associated with the site, or external environmental factor data associated with external environmental factors affecting the site, with the determined usage of the pesticide substance.

Aspect 92: The non-transitory computer-readable storage medium of any preceding or subsequent aspect, or combinations thereof, wherein the one or more pesticide dispensing units each comprise a receiver module configured to receive communications from the computer device, and wherein the non-transitory computer-readable storage medium includes further computer-readable program code stored therein that in response to execution by the processor, causes the apparatus to direct at least the pesticide module of any of the pesticide dispensing units to meter the pesticide substance dispensed therefrom for forming a specified concentration of the pesticide substance in the diluent of the pest treatment to be dispensed from the pesticide dispensing unit.

Aspect 93: The non-transitory computer-readable storage medium of any preceding or subsequent aspect, or combinations thereof, including further computer-readable program code stored therein that in response to execution by the processor, causes the apparatus to determine a weather forecast associated with the site, and direct the pesticide dispensing unit to refrain from dispensing the pest treatment at the site, if the weather forecast includes a weather event contraindicating dispensation of the pest treatment.

Aspect 94: The non-transitory computer-readable storage medium of any preceding or subsequent aspect, or combinations thereof, comprising a geospatial location module engaged with each of the one or more pesticide dispensing units, wherein the non-transitory computer-readable storage medium includes further computer-readable program code stored therein that in response to execution by the processor, causes the apparatus to correlate a location of the site with locations of the pesticide dispensing units determined from the respective geospatial location module, and dispatch a pest control technician, associated with the pesticide dispensing unit closest to the location of the site, to the site to dispense the pest treatment.

Aspect 95: The non-transitory computer-readable storage medium of any preceding or subsequent aspect, or combinations thereof, comprising a geospatial location module engaged with each of the one or more pesticide dispensing units, wherein the non-transitory computer-readable storage medium includes further computer-readable program code stored therein that in response to execution by the processor, causes the apparatus to determine the locations of the pesticide dispensing units from the respective geospatial location module, compare the location of any one of the pesticide dispensing units to pest treatment restrictions for the location, and designate an alternate pest treatment if the designated pest treatment conflicts with the pest treatment restrictions for the location.

Aspect 96: The non-transitory computer-readable storage medium of any preceding or subsequent aspect, or combinations thereof, wherein the pesticide module is configured to monitor consumption of the pesticide substance housed thereby and to transmit associated consumption data to the computer device associated with the non-transitory computer-readable storage medium via the transmitter module, and wherein the non-transitory computer-readable storage medium includes further computer-readable program code stored therein that in response to execution by the processor, causes the apparatus to analyze the consumption data to determine a usage rate for the pesticide substance in the pesticide module, an ordering interval for a replacement pesticide module to replace the pesticide module upon depletion of the pesticide substance housed thereby, a retrieving interval for retrieving the pesticide module upon depletion of the pesticide substance housed thereby, or an inventory level of the pesticide modules required to provide expedient replacement of the pesticide module upon depletion of the pesticide substance housed thereby.

Aspect 97: The non-transitory computer-readable storage medium of any preceding or subsequent aspect, or combinations thereof, including further computer-readable program code stored therein that in response to execution by the processor, causes the apparatus to compare the consumption data to an inventory of pesticide modules housing the pesticide substance and pesticide modules depleted of the pesticide substance, to generate audit data.

Aspect 98: The non-transitory computer-readable storage medium of any preceding or subsequent aspect, or combinations thereof, including further computer-readable program code stored therein that in response to execution by the processor, causes the apparatus to determine supply chain information associated with the pesticide module housing the pesticide substance, and comparing the supply chain information to pest detection information associated with the site, to monitor pesticide substance product quality or pesticide substance performance metrics.

These and other features, aspects, and advantages of the present disclosure will be apparent from a reading of the following detailed description together with the accompanying drawings, which are briefly described below. The present disclosure includes any combination of two, three, four, or more of the above-noted aspects as well as combinations of any two, three, four, or more features or elements set forth in this disclosure, regardless of whether such features or elements are expressly combined in a specific aspect description herein. This disclosure is intended to be read holistically such that any separable features or elements of the present disclosure, in any of its various aspects, should be viewed as intended to be combinable unless the context clearly dictates otherwise. Aspects of the present disclosure thus provide advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 3 is a schematic of a pest monitoring device distribution arrangement for monitoring a site using a pest monitoring and control system, according to one aspect of the present disclosure;

FIG. 11 is an operation flow diagram of a method of pesticide application at a site, according to one aspect of the present disclosure.

DETAILED DESCRIPTION

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

Figure 1:
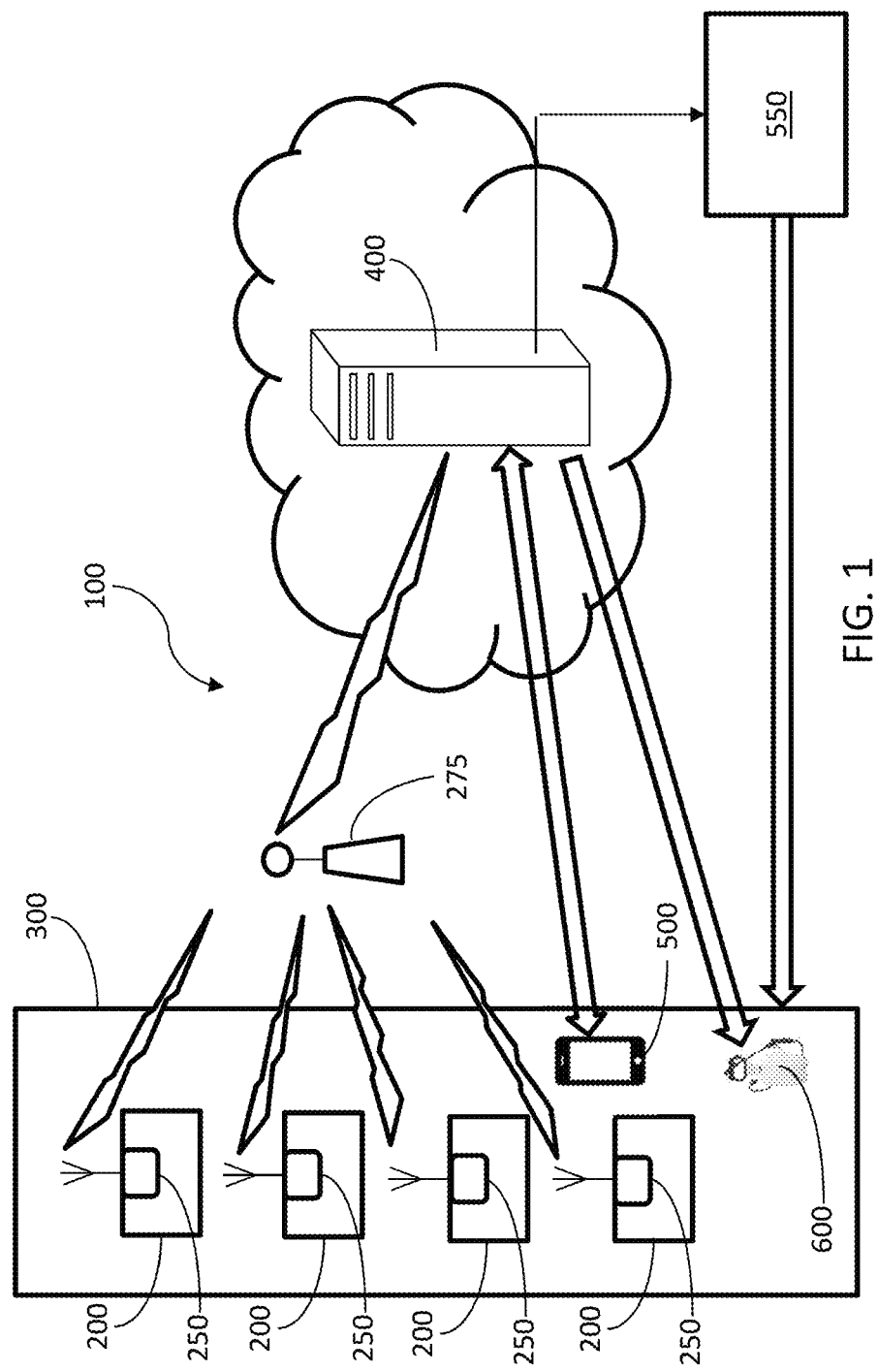
FIG. 1 is a schematic of a pest monitoring and control system, according to one aspect of the present disclosure.

FIG. 1 schematically illustrates a pest monitoring and control system 100, according to one aspect of the present disclosure. The system 100 comprises a plurality of pest monitoring devices 200, each configured for placement at a site 300. Each pest monitoring device 200 is further configured to generate a signal in response to detection of a pest, once the pest monitoring device 200 is deployed at the site 300. A computer device 400, remotely disposed with respect to the pest monitoring devices 200, is configured to be in communication with the pest monitoring devices 200, so as to receive the generated signals therefrom, with the signals from the pest monitoring devices 200 comprising actual site data (i.e., actual collected data associated with or originating from the site 300 and representing actual events or conditions at the site 300). In some aspects, the computer device 400 may be disposed remotely to the site 300 (i.e., remote/central monitoring and communication). In other aspects, the computer device 400 may be disposed at the site 300, but remotely and spaced apart from the pest monitoring devices 200.

The pest monitoring devices 200 may have many different configurations. One example of an appropriate pest monitoring device 200 is disclosed, for example, in co-pending U.S. patent application Ser. No. 15/485,838 to Byron Reid, Volker Gutsman, Michael Zimmerman, Chris Pienaar and Gaelle Fages, filed Apr. 12, 2017 and assigned to Bayer CropScience LP and Bayer AG, which is incorporated herein by reference in its entirety. In one aspect, each pest monitoring device 200 includes, for example, an appropriate detection arrangement for detecting a pest, depending on whether that pest is walking, crawling, or flying. That is, for example, the pest detection arrangement implemented in an appropriate pest monitoring device, may be configured differently for a flying insect than for a rodent or roach. In another aspect, each pest monitoring device 200 includes at least a transmitter module 250 engaged with the pest detection arrangement, with the transmitter module 250 being configured for communicating a detection signal from the pest detection arrangement to the computer device 400. The detection signal in some aspects includes, for example, the identity of the pest detected by the pest monitoring device 200. In other aspects, the detection signal may only include the number or amount of detection events indicated by the pest monitoring device 200. The communication between the transmitter module 250 and the computer device 400 may be through a direct communication link therebetween or, in some instances, via a communication gateway or hub 275. In some aspects, the pest monitoring device 200 also includes a receiver module (not shown) for receiving communications, whether from the computer device 400 or other device appropriately configured for communication therewith.

Figure 2:
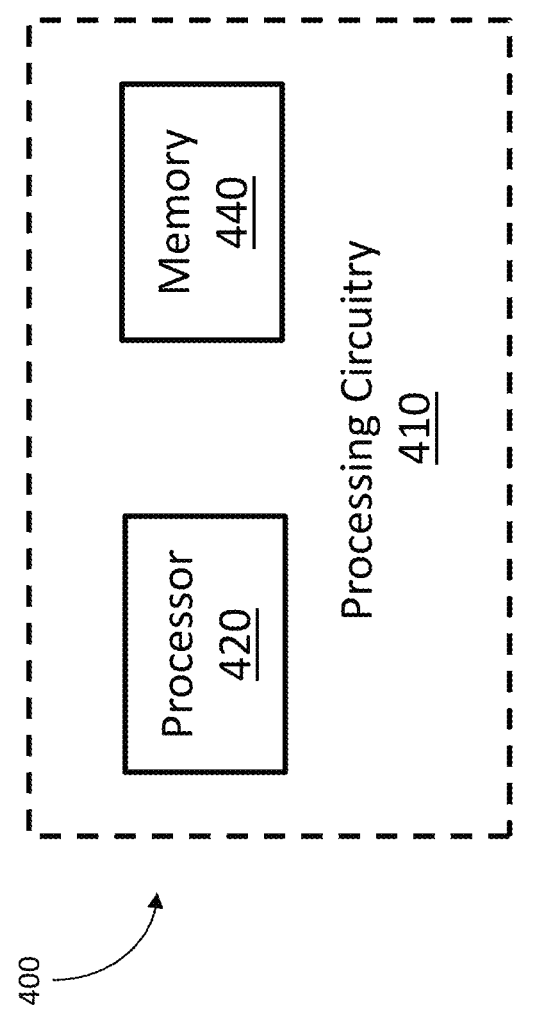
FIG. 2 is a schematic of a computer device element of a pest monitoring and control system and/or a pesticide application system, according to various aspects of the present disclosure.

As shown in FIG. 2, the computer device 400 comprises processing circuitry 410, a processor 420 and a non-transitory memory 440 storing executable instructions that, in response to execution by the processor 420, cause the computer device 400 to perform particular functions, at least with respect to the pest monitoring device(s) 200 in communication therewith. For example, in one aspect, the computer device 400, upon executing appropriate instructions stored therein, is configured to analyze environmental factor data and historical factor data associated with the site 300 in order to determine an amount of the pest monitoring devices 200 suggested for monitoring the site 300. In some instances, the analysis also includes a placement location about the site 300 for each of the pest monitoring devices 200.

The environmental factor data is, for example, associated with environmental factors of and about the site 300, wherein such factors are conducive to pest population development. Exemplary environmental factors associated with the site 300 include potential food sources, water sources, or other harborage for pests. If the site 300 includes a building or facility, surrounded by other property, the considerations of potential food sources, water sources, or other harborage includes conditions both within the building or facility, and external to or surrounding the building or facility. Non-inclusive examples of pertinent site conditions include food and water sources within the building or outside the building, the locations of any ingress/egress doors, locations of supplies or inventory, locations of raw material processing or storage, shipping/delivery locations, the nature and/or frequency of deliveries, temperature within and/or outside the building (i.e., a heat source), humidity within or outside the building, lighting, locations of disposal of refuse/waste, whether there is any failed or comprised structural integrity of the building, locations of cafeterias or break rooms, and/or locations of restroom facilities.

The historical factor data is, for example, associated with factors indicative of historic pest populations at the site. In one aspect, such historical factor data includes whether there has previously been pest monitors/traps at the site, the conditions of the site associated with each of those pest monitors/traps, and the amount, type, frequency, or other historical data of the pests registered by those pest monitors/traps.

Based on the analysis of the environmental factor data and the historical factor data, the computer device 400 is configured to determine the amount of the pest monitoring devices 200 suggested for monitoring the site 300 and/or the placement location about the site 300 for each of the pest monitoring devices 200. In some aspects, the amount and/or placement location of the pest monitoring devices 200 may be determined by the computer device 400 according to a particular factor of the site 300. For example, as shown in FIG. 3, the determination of the amount and/or placement location of the pest monitoring devices 200 may include a designation thereof on a linear measure of the perimeter of a building or facility at the site 300 (i.e., the default is a maximum linear spacing of the pest monitoring devices 200 about the perimeter of the building facility (or a minimum number of pest monitoring devices 200 per linear foot of perimeter), wherein the linear spacing is decreased/the amount of pest monitoring devices 200 deployed increases based on the environmental factor data and historical factor data considered by the computer device 400 (increase over the minimum number of pest monitoring devices per linear foot)).

Figure 4:
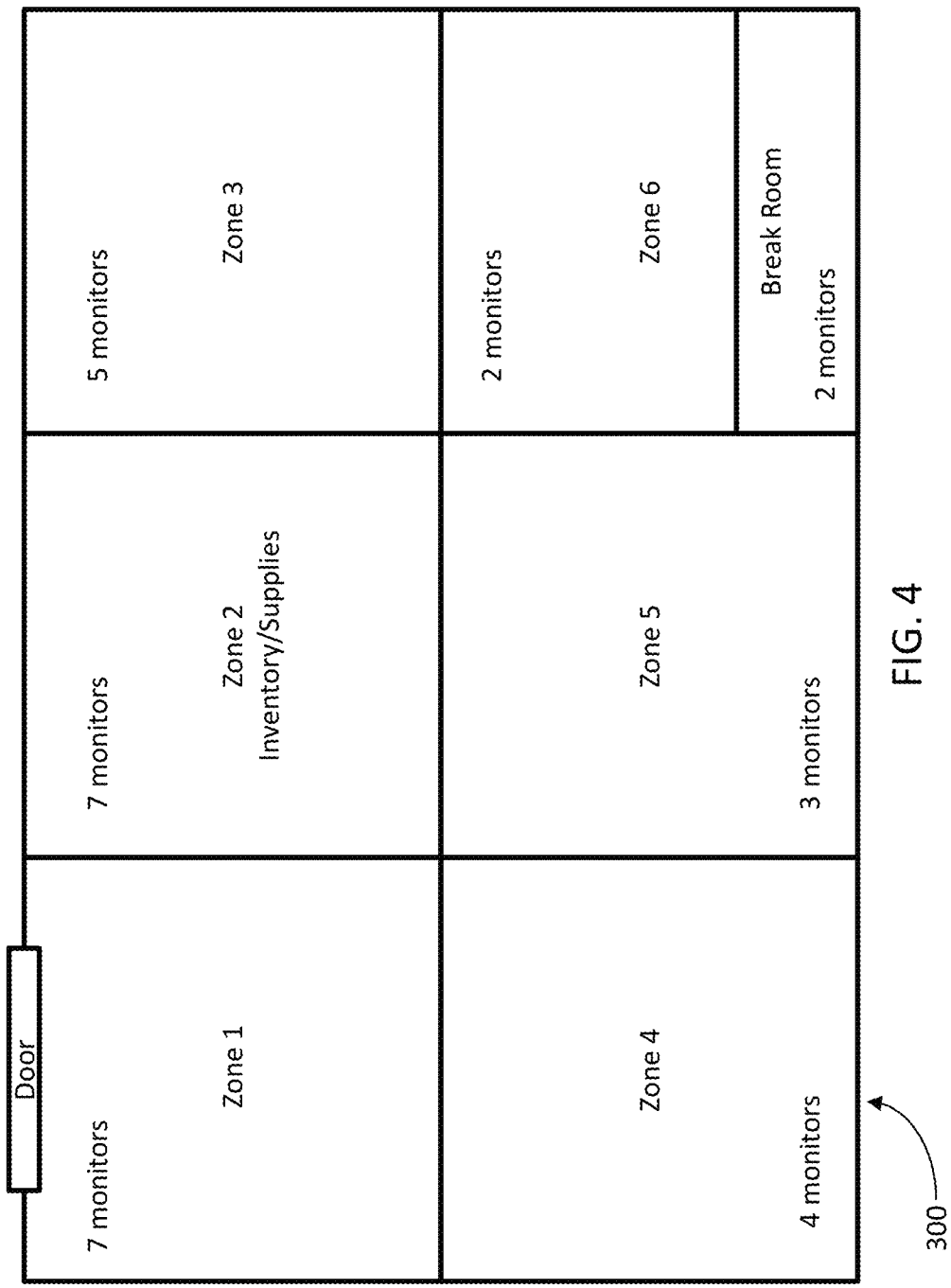
FIG. 4 is a schematic of a distribution of pest monitoring devices at a site using a pest monitoring and control system, according to one aspect of the present disclosure.

Further, in some aspects, the computer device 400 is configured to direct the deployment (of the amount and/or placement) of the pest control monitoring devices 200 about the site 300 according to the analysis. In some particular aspects, the computer device 400 is configured to direct the deployment (of the amount and/or placement) of the pest control monitoring devices 200 about the site 300 according to the analysis and in relation to a geospatial map of the site 300. That is, in some aspects, the result of the analysis provided by the computer device 400 is the particular placement, type of pest monitor/trap, etc. shown or otherwise provided in relation to a site map or layout of the building, as shown, for example, in FIG. 4.

In some aspects, the computer device 400 is configured to modulate or direct the modulation of at least the amount of pest monitoring devices 200 deployed about the site 300, based on a risk tolerance factor. Such a risk tolerance factor comprises, for example, various factors of business risk, such as audit frequency or history of past audit failures. In considering any risk tolerance factor, the computer device 400 may propose, direct, or otherwise adjust (increase or decrease) at least the final number or amount of the pest monitoring devices 200 to be deployed for effectively monitoring the site. In some instances, the consideration of the risk tolerance factor may result in adjustment of at least the number of pest monitoring devices 200 at certain, but not all, locations about the site 300. In other instances, the consideration of the risk tolerance factor may result in adjustment of at least the number of pest monitoring devices 200 at certain, but not all, locations about the site 300. In still other aspects, the consideration of the risk tolerance factor may result in adjustment of the type or location of pest monitoring devices 200 at certain locations about the site 300.

Figure 5:
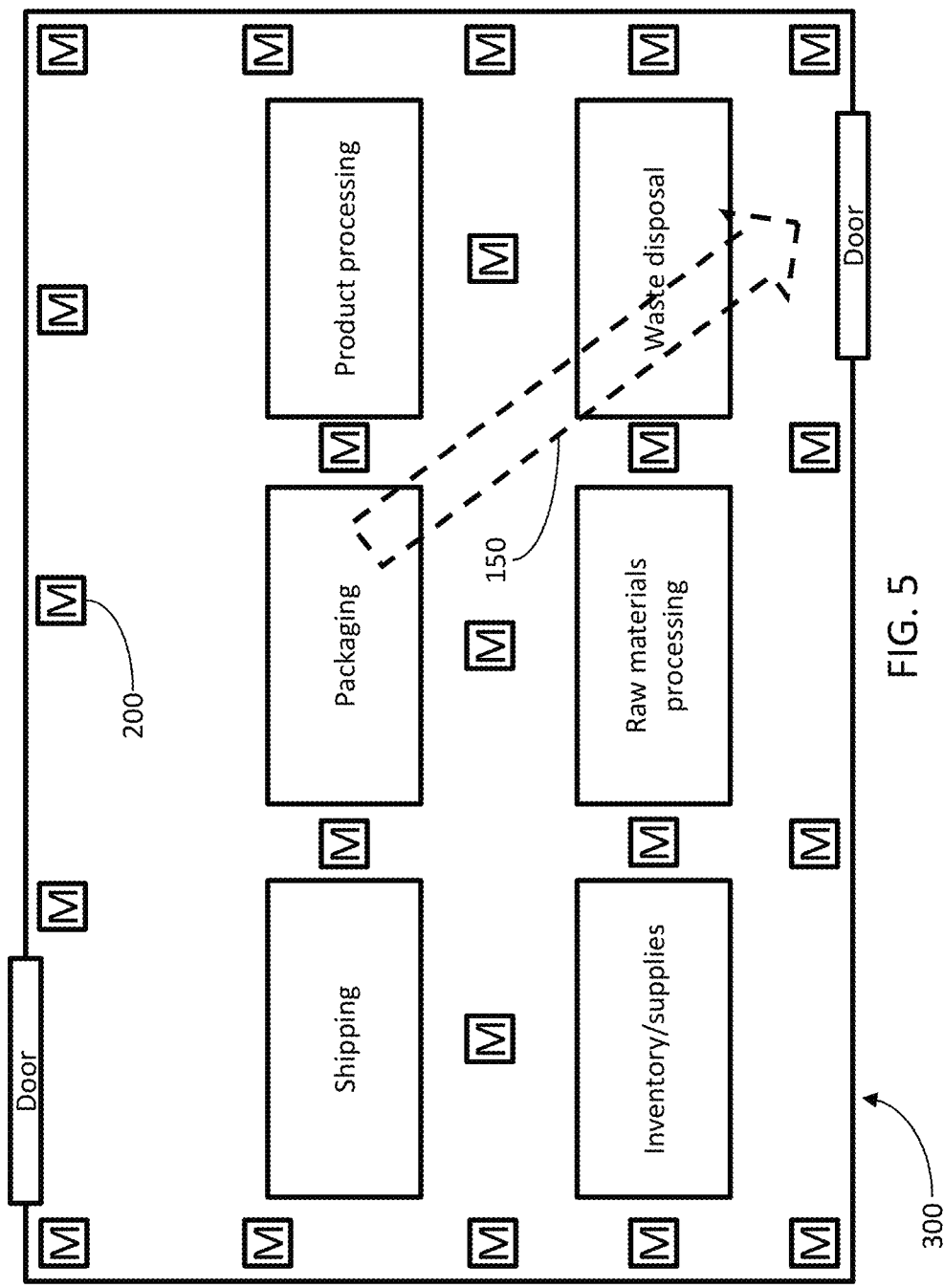
FIG. 5 is a schematic of a distribution of pest monitoring devices at a site using a pest monitoring and control system, according to one aspect of the present disclosure, wherein actual site data collected from the pest monitoring devices provides a vector indication as to a source of a pest infestation.

In some aspects, for example, in response to detection of a pest by any of the pest monitoring devices 200, the computer device 400 is configured to analyze the actual site data (i.e., the pest detection data transmitted to the computer device 400) to determine a location or a potential source of the detected pest about the site 300. For example, as shown in FIG. 5, the computer device 400 may be configured to analyze the actual site data to determine a vector 150 indicating the location or the potential source of the detected pest about the site 300. More particularly, in such an aspect, the computer device 400, knowing the geospatial location of the pest monitoring devices 200 with respect to each other (i.e., according to the relative placements of the pest detection devices 200 in relation to the geospatial map, site plan, etc. of the site 300), and in view of the actual site data received from the pest detection devices 200, is configured to correlate the pest detection signals from the various pest monitoring devices 200 to develop a vector 150 directed toward a possible root cause, location, or potential source, as indicated by the environmental factor data associated with the site 300. Once the source of a possible pest infestation is known, or there is otherwise a vector indication of a possible source, location, or root cause of that pest infestation, appropriate measures can be taken to counteract the pest infestation. For example, a pest control technician may be dispatched to the site 300 to effectuate an appropriate pest control solution and/or the site 300 may be notified to remove, alter, or otherwise address the possible site or root cause for the infestation.

Once actual site data has been collected for a period of time, that actual site data becomes historical pest detection data and/or environmental data for the site 300, and risk tolerance factors may change. Accordingly, in some aspects, the computer device 400 is further configured to be adaptable or capable of self-learning, so as to periodically or on-demand, analyze the actual site data with the environmental factor data and the historical factor data, updated over the previous analysis or the original analysis, to determine whether the placement location of the pest monitoring devices 200 about the site 300 should be altered, and/or whether the amount of the pest monitoring devices 200 deployed about the site 300 should be altered (i.e., to provide for more optimal coverage of the site 300 by the pest monitoring devices 200). That is, the algorithms executed by the computer device 400 are self-learning and adaptable, in that as time passes and pest activity is tracked or as business risk sensitivity changes, the algorithms will adjust to changing conditions at the site 300 and will propose reducing or increasing the number and/or altering the location of the necessary pest detection devices 200.

In particular aspects, upon the computer device 400 determining the source of a possible pest infestation at the site 300, or determining that there is otherwise a vector indication of a possible source, location, or root cause of that pest infestation, the computer device 400 is configured to designate a remedy for the detected pest or the potential source thereof at the site 300. In some instances, prior to designating a remedy, as shown in FIG. 1, the computer device 400 is configured to direct one or more identification inquiries to a remote terminal 500 in response to the actual site data. The remote terminal 500, in such aspects, is configured to receive responses to the one or more identification inquiries input therein from the site 300 and to direct the responses to the computer device 400. Accordingly, the computer device 400 is responsive to the responses from the remote terminal 500 to identify the detected pest and thus designate a particular targeted remedy for the identified (detected) pest or the identified source thereof at the site 300. For example, the remote terminal 500 may comprise a smart phone, tablet, laptop computer, or the like, in possession of a pest control technician dispatched to the site 300.

Upon dispatch of a pest control technician from a pest control organization (PCO) 550 (see, e.g., FIG. 1) and arrival of the pest control technician at the site 300, the computer device 400, in response to receipt of pest detection signals/actual site data (not necessarily identifying the detected pest), can direct the pest control technician to the pest monitoring device(s) 200 sending the pest detection signals. The computer device 400, via the communication with the remote device 500, may, for example, prompt the pest control technician for an identification of the detected pest or otherwise request a response from the pest control technician, to one or more questions regarding the apparent characteristics of the detected pest. On the basis of the appropriate response(s) from the pest control technician, the computer device 400 can then determine a particular source of the infestation and/or designate a particular remedy or treatment to address the detected pest(s). In such instances, as will be appreciated by one skilled in the art, if the identified pest is a roach, the designated remedy may be much different than if the identified pest is a rodent.

In some aspects of the disclosure, the remedy for the detected pest(s), as determined by the computer device 400, may be effectuated by the computer device 400 directing the remedy for the detected pest(s) or the potential source thereof at the site 300, to a pesticide dispenser 600 (see, e.g., FIG. 1) configured to effectuate the remedy at the site 300, or to a pest control technician directed to effectuate the remedy at the site 300, whether or not using the pesticide dispenser 600. That is, the pesticide dispenser 600 may be a fixed unit located at the site in fixed location, or may be a portable unit in possession of a pest control technician dispatched to the site 300. In either instance, the pesticide dispenser 600 may be configured to be in communication with the computer device 400, whether directly or via appropriate communication equipment.

In further aspects of the disclosure, the computer device 400 is configured to analyze the actual site data in comparison to operational activity data associated with operational activity factors at the site 300 or external environmental factor data associated with external environmental factors affecting the site 300, to forecast a future pest infestation event at the site 300. Additionally, in some aspects, the computer device 400 is configured to analyze data from environmental monitors associated with the site 300, physical factors data associated with the site 300, data from facility monitors associated with the site 300, or data associated with operation factors associated with the site 300, to determine any correlation thereof with the actual site data so as to identify a root cause of a pest infestation at the site or recommend measures for preventing a future pest infestation.

Operational activity factors or operation factors may include, for example, issues apparent from a current site landscape or map (e.g., the physical environment, building design), data from facility sensors (e.g., open doors, water leaks), and/or data from operational factors (e.g., raw ingredient deliveries, site drainage). External environmental factors may include, for example, data from environmental monitors (e.g., temperature, humidity, etc.) or seasonal factors. By correlating the operational activity factors or the external environmental factors with the actual site data and/or trends evident therein, the computer device 400 is capable, for example, of forecasting a future pest infestation event at the site 300. In other instances, the correlations may allow the computer device 400 to expand a root cause analysis to recommend changes in structures, operations and atmospheric modifications associated with the site 300 to prevent such pest problems. That is, in some aspects, the computer device 400 is also configured to determine changes in operational activity factors associated with the operational activity data, changes in environmental factors associated with the environmental factor data, or preventative factors, which may be implemented to counteract the forecasted future pest infestation event.

In some aspects, the computer device 400 is configured to vary the designated remedy or an active ingredient of the designated remedy (i.e., the active ingredient or active substance of a pesticide application) for the detected pest or the potential source thereof at the site 300 so as to prevent or delay development of resistance to the remedy or the active ingredient of the designated remedy by the detected pest. That is, the computer device 400 may be configured to monitor pesticide product usage for a site 300, and can recommend a pesticide product usage rotation that can prevent or delay the development of physiological or behavior resistance to a particular pesticide product or active ingredient thereof in pest population about the site 300. In other instances, the computer device 400 may be configured to notify a site manager to prevent a pest control technician at the site 300 from using a particular pesticide product, in order to comply with certain pesticide resistance management guidelines.

In still other aspects, the computer device 400 may be configured to correlate actual site data with the designated remedy for the detected pest or the potential source thereof at the site so as to determine any change in pest activity in response to the designated remedy or to rate effectiveness of the designated remedy according to the pest activity being treated. That is, in some aspects, by correlating pest activity at the site 300 (such pest activity being determined, for example, pest monitoring devices 200 and/or by manual data entry from personnel observation sat the site 300) with pesticide product usage, the computer device 400 can analyze changing pest activity at the site 300 as a consequence of particular pesticide product usage. This correlation analysis by the computer device 400 will allow, for example, benchmarking of the performance a particular pesticide product against a particular pest in regard to a specific site 300 or over a number of sites. Over continued analysis of actual site data, a self-learning aspect may be utilized by the computer device 400, wherein the computer device 400 can learn or be adaptive to propose or recommend the usage of particular pesticide products that are best suited against a pest at a specific site 300 or number of sites based upon updated data.

In another aspect, the computer device 400 is configured to analyze the actual site data to determine whether pest activity associated therewith is increasing, in relation the designated remedy (i.e., pesticide) or effectuation (i.e., application) parameters associated therewith, to recommend further remedial action at the site 300. The further remedial action includes, for example, adjusting the effectuation parameters within a recommended range, addressing site factors not associated with the effectuation parameters, and altering the designated remedy or an active ingredient of the designated remedy so as to prevent or delay development of resistance to the remedy by the detected pest. That is, if pest detection incidences are increasing at the site 300 and the remedy (i.e., pesticide product) usage is outside of normal acceptable or recommended limits, the computer device 400 is configured to direct corrective effectuation (i.e., application of the pesticide product within acceptable or recommended limits) of the designated remedy to return the level of detected pests to below an acceptable threshold. If pest detection incidences are increasing at the site 300 and the remedy (i.e., pesticide product) usage is within normal acceptable or recommended limits, then the computer device 400 is configured to alert site personnel or pest control technicians to perform more detailed inspections of the building/facilities of the site 300 to search for conditions that are conducive to pest survival/development. If pest detection incidences are increasing at the site 300 despite proper usage and effectuation of the designated remedy, then the computer device 400 may be configured to provide an early warning system to alert the site manager of the possible development of physiological and/or behavioral resistance to a designated remedy in a pest population about the site 300. In such instances, the computer device 400 may also recommend alternate remedies or site management actions to maintain effective control of the pest population about the site 300.

In still other aspects, the computer device 400 may be configured to compare the designated remedy to any remedy restrictions for the site 300, and to designate an alternate remedy, if the designated remedy conflicts with the remedy restrictions. That is, in some instances, certain governmental authorities (federal, state, local) may have prohibitions against the use of certain pesticide products in certain locales that may include the site 300. For example, despite federal registration of the pesticide substance, use of that pesticide substance may not be allowed within a protected zone around a known habitat for an endangered species. Alternately, while the federal government may have approved a particular pesticide substance, a state or local government may have adopted restrictions that supersede federal approval, at least for certain locales. In such aspects, the computer device 400 may be configured to associate a location of the site with the designated remedy in relation to an accessible directory of any such applicable pesticide substance restrictions for the location of the site 300 and to alert the site manager or pest control technician, before a particular pesticide product is dispatched to or applied at the site, thereby preventing a legal compliance issue.

EXAMPLE 1

Figure 6:
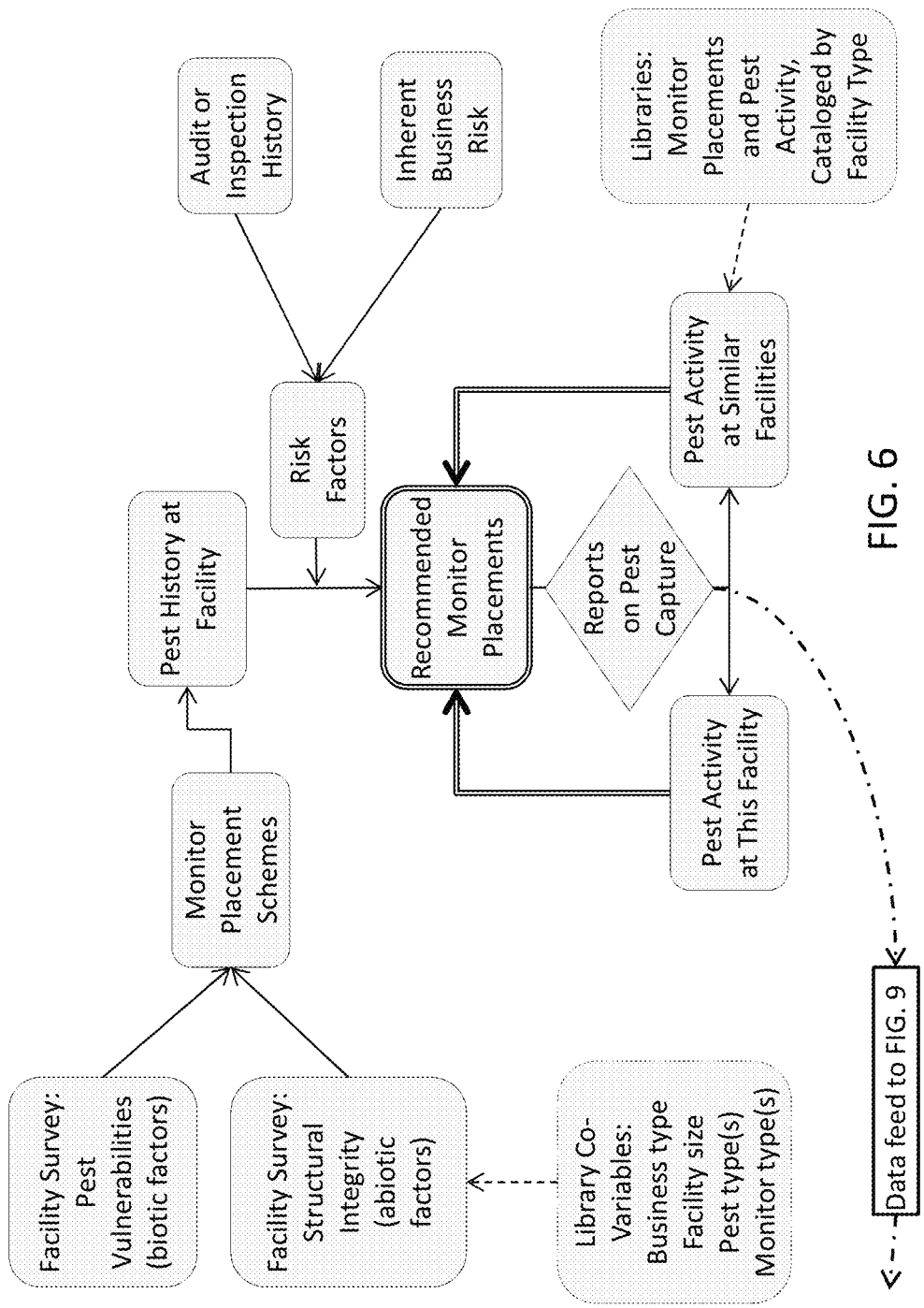
FIG. 6 is a schematic of an exemplary implementation of a pest monitoring and control system to optimize a distribution of pest monitoring devices at a site in relation to actual data collected from the site, according to one aspect of the present disclosure discussed in Example 1.

FIG. 6 is a schematic illustrating an exemplary implementation of a pest monitoring and control system to optimize a distribution of pest monitoring devices at a site in relation to actual data collected from the site, according to one aspect of the present disclosure.

An account to be monitored generally includes one or more sites, wherein pest monitoring devices as disclosed herein must be distributed at and about each site. Initially, each site being monitored is tagged with descriptive features for a facility, such as the nature of the business, its location, the facility size, and the type(s) of pests considered or type(s) of monitors deployed. Two site-specific surveys are then completed. One survey assesses abiotic factors that enable pest incidence in a facility, such as the number of external openings (e.g., doors, loading docks, windows) in a building, through which pests could travel into the facility. Another survey assesses biotic factors that sustain pest incidence within a facility, such as open food or water sources.

Results of these surveys are then analyzed to determine the number and placement of pest monitors at the monitored site. For example, as suggested by the analysis results, one monitor is placed on either side of doors that serve as pest entry points and/or one monitor is located within a prescribed distance of a food and/or water source to which pests frequently travel. With a base number of pest monitor locations about the site, thus determined, recent history of pest activity at the site is cross-referenced with the suggested pest monitor distribution from the initial analysis, to further suggest an increase in the number of pest monitors at locations about the site with a historical record of pest activity to form an adjusted distribution of pest monitors. Finally, a risk quotient may be applied to the adjusted distribution to further modify the number of deployed pest monitors, wherein the risk quotient may be 1) proportional to the record of past pest incidents as reflected in historical audits or inspections, 2) related to the risk tolerance for the particular type of business conducted at the site.

The foregoing process defines the scheme for recommended number and placement of pest monitors within and/or about a facility at a site for detecting the presence of unwanted pests. As the system is operated, and individual pest reports from the pest monitors accrue. The system can "learn" from the accrued pest reports to periodically change the number of pest monitors and/or optimize the distribution/placement of the pest monitors, in response to on-going pest activity within or about the facility, or otherwise at the site. Additionally or alternatively, the system can draw data from a "library" of pest monitoring device deployment at other facilities/sites running a similar type of business, having a similar facility size or location, etc. In this manner, the number and placement of pest monitors at the monitored site can be continuously or periodically optimized (increased or decreased, or repositioned) to minimize the expense of pest monitoring hardware, while keeping pest incidence within acceptable limits set for the facility/site.

Figure 7:
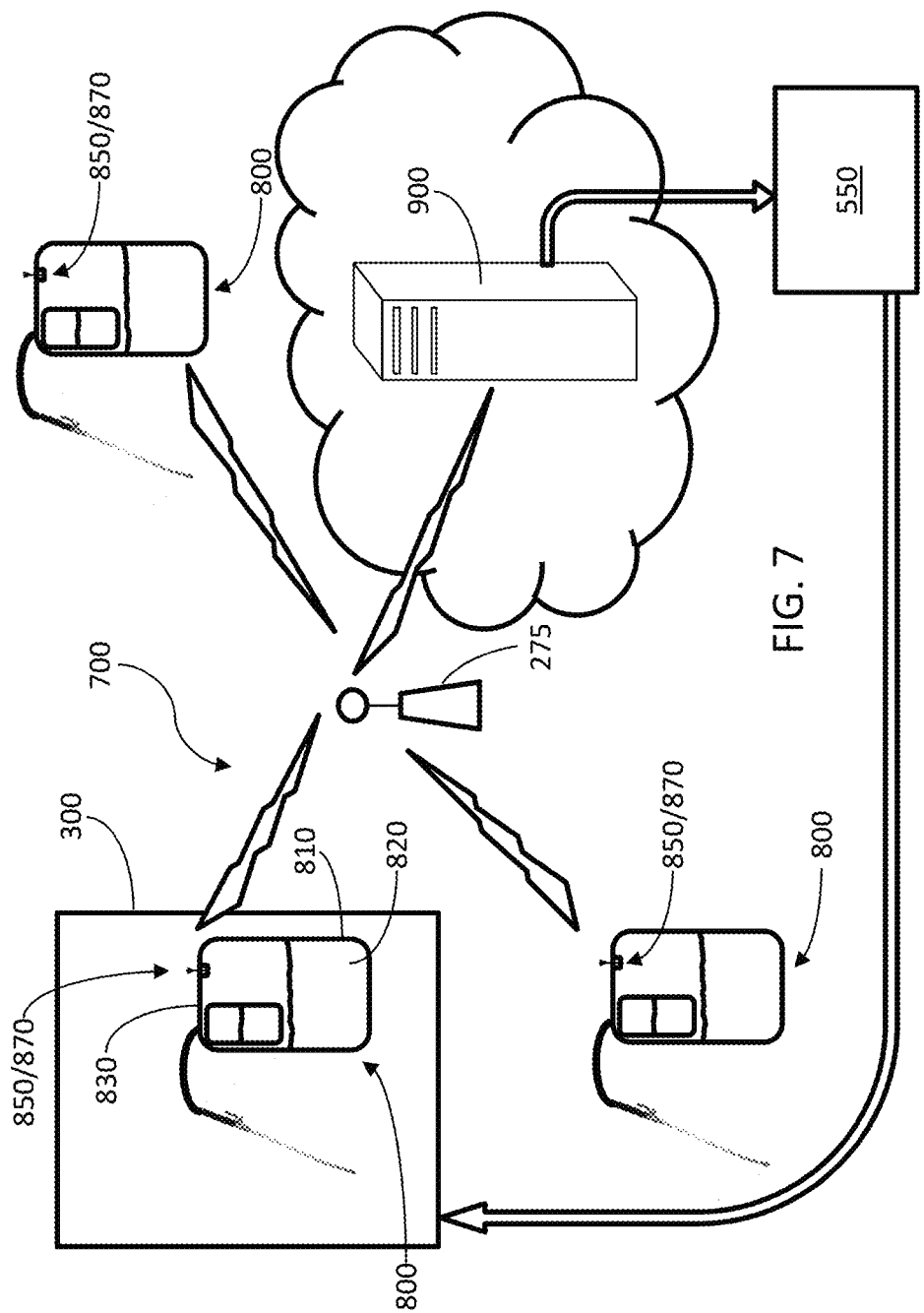
FIG. 7 is a schematic of a pesticide application system, according to one aspect of the present disclosure.
Figure 8:
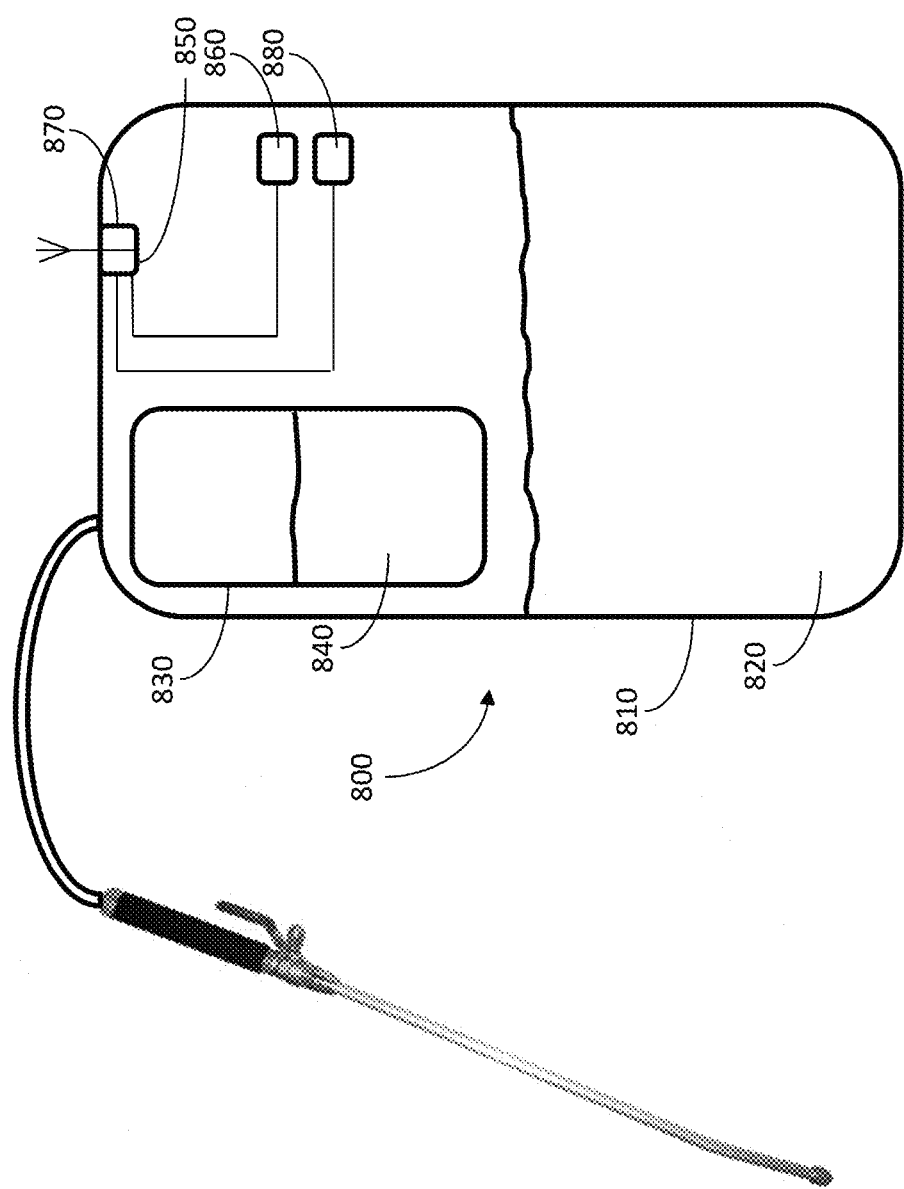
FIG. 8 is a schematic of a pesticide dispensing unit for use in a pesticide application system, according to one aspect of the present disclosure.

Another aspect of the present disclosure is directed to a pesticide application system 700, comprising one or more pesticide dispensing/application units 800 (see, e.g., FIG. 7), wherein, as shown in FIG. 8, each pesticide dispensing/application unit 800 includes a reservoir 810 configured to house a diluent 820, a pesticide module 830 configured to house a pesticide substance 840, and a transmitter module 850 configured to transmit data therefrom; and a computer device 900 remotely disposed with respect to the pesticide dispensing/application units 800. As termed herein, element 800 may be referred to as one in the same as a pesticide dispensing unit, a pesticide application unit, and/or a pesticide dispensing/application unit, as appropriate or desired. In particular aspects, the computer device 900 is configured to receive pesticide substance usage data from the pesticide dispensing units 800 via the respective transmitter module 850, wherein the pesticide substance usage data includes, for example, an amount or a rate of the pesticide substance 840 dispensed from the pesticide module 830 of any of the pesticide dispensing units 800 to form a pest treatment having a concentration of the pesticide substance in the diluent, and wherein the formed pest treatment is dispensed from the pesticide dispensing unit 800, whether automatically or through usage of the pesticide dispensing unit 800 by a pest control technician, to treat a pest at the site 300.

In particular, the computer device 900 comprises processing circuitry, a processor and a non-transitory memory (see, e.g., computer device 400 as shown in FIG. 2) storing executable instructions that, in response to execution by the processor, cause the computer device 900 to at least determine and monitor usage of the pesticide substance 840. In some aspects of the disclosure, the one or more pesticide dispensing units 800 may each comprise a receiver module 870 (see, e.g., FIG. 8) configured to receive communications from the computer device 900, and wherein the computer device 900 is configured to direct at least the pesticide module 830 of any of the pesticide dispensing units 800 to meter the pesticide substance 840 dispensed therefrom for forming a specified concentration of the pesticide substance 840 in the diluent 820 of the pest treatment to be dispensed from the pesticide dispensing unit 800. The pesticide dispensing units 800 may have many different configurations. One example of an appropriate pesticide dispensing unit 800 including a reservoir 810 configured to house a diluent 820, and a pesticide module 830 configured to house a pesticide substance 840 is disclosed, for example, in co-pending U.S. patent application Ser. No.15/485,838 to Byron Reid, Volker Gutsman, Michael Zimmerman, Chris Pienaar and Gaelle Fages, filed Apr. 12, 2017 and assigned to Bayer CropScience LP and Bayer AG, which is incorporated herein by reference in its entirety.

In particular aspects, the pesticide application system 700 may be a "stand-alone" system arranged in the manner herein disclosed. In other aspects, the pesticide application system 700 may be included in or otherwise associated with the pest monitoring and control system 100 disclosed hereinabove. More particularly, in such aspects, the computer device 400 of the pest monitoring and control system 100 may the same as, cooperative with, or otherwise associated with the computer device 900 of the pesticide application system 700. In such instances, actual site data may be provided to the computer device 900 of the pesticide application system 700 by the pest monitoring device(s) 200 of the pest monitoring and control system 100. Further, the pesticide dispensing unit(s) 800 of the pesticide application system 700 may be the designated remedy, may include the designated remedy, or at least associated with the designated remedy dispatched to the site 300 by the computer device 400 of the pest monitoring and control system 100 (or by the computer device 900, either directly or via notification of a PCO 550 as shown, for example, in FIG. 7), for automatic effectuation or by effectuation by directions/instructions imparted to a pest control technician, to address one or more detected pests at the site 300. With such a comprehensive overall system, according to some aspects, a regional, national, or global database on pesticide application practices can be apportioned by job type and correlated with pest detection incidences derived from pest monitoring devices 200 or other actual site data. On this broad application of such a system, performance of pest management programs implemented by various pest control organizations (PCOs) can be monitored and analyzed, and best practices recommendations in regard to pesticide application can be determined.

In some aspects, the system 700 comprises a plurality of pesticide dispensing units 800. In such instances, the computer device 900 is configured to determine an overall usage of the pesticide substance 840 based on the amount or the rate thereof dispensed from the pesticide modules 830 of the collective plurality of the pesticide dispensing units 800. Based on the determined usage amount or usage rate of the pesticide substance 840, the computer device 900 is configured to determine a normal usage distribution statistic for the pesticide substance 840 dispensed from one or more of the pesticide dispensing units 800. Once the normal usage distribution statistic is determined, the computer device 900 is configured to compare the determined usage of the pesticide substance 840 from any of the pesticide dispensing units 800 to the normal usage distribution statistic to determine any of the pesticide dispensing units 800 dispensing more than or less than the normal usage distribution statistic for the pesticide substance 840.

That is, in some aspects, by tracking usage of a pesticide substance 840 at the level of an individual pesticide dispensing unit 800, a pest control organization (PCO) manager can index or benchmark usage of the pesticide substance 840 by a particular pesticide dispensing unit 800 against a pool or selected group of pesticide dispensing units 800 performing a similar job/dispensing the same pesticide substance 840, whether the selected group of pesticide dispensing units 800 are within the same PCO, or whether the selected group extends across several different PCOs in a particular region or across the nation. By tracking/monitoring the usage of a pesticide substance by certain pesticide dispensing units 800, for example, by a particular job type (i.e., a routine dispatch of a pest control technician to respond to a pest detection at a site 300 in a region having other similar sites that are being monitored/treated), the computer device 900 is configured to determine distribution statistics for "normal usage" of the pesticide substance 840 and can automatically flag or highlight individual pesticide dispensing unit(s) 800 and the pest control technician(s) associated therewith that are statistical outliers from the normal distribution statistic for usage of the pesticide substance 840. As a result, the PCO manager for the pest control technician can be alerted/ notified to take corrective action(s) with respect to that pest control technician in order to improve job performance or manage costs. In one example, each pesticide dispensing unit 800 is associated with a pest control technician and, in response to the determined usage of the pesticide substance 840 from any of the pesticide dispensing units 800 being outside the normal usage distribution statistic, the computer device 900 is configured to determine remedial pesticide application training for the pest control technician.

In another aspect of the present disclosure, the one or more pesticide dispensing units 800 each comprise a timer module 860 (see, e.g., FIG. 8) in communication with the transmitter module 850, wherein the timer module 860 is configured to determine a duration of a pesticide application event by the respective pesticide dispensing unit 800, and wherein the computer device 900 is configured to determine a normal duration (i.e., the duration of a pesticide application event) distribution statistic for a plurality of the pesticide application events. In some instances, the computer device 900 is configured to compare the determined duration of the pesticide application event from any of the pesticide dispensing units 800 to the normal duration distribution statistic, in order to determine any of the pesticide dispensing units 800 being used for more than or less than the normal duration distribution statistic for the plurality of pesticide application events. In such instances, each pesticide dispensing unit is associated with a pest control technician, and, in response to the determined duration of the pesticide application event from any of the pesticide dispensing units 800 being outside the normal duration distribution statistic, the computer device 900 is configured to determine and monitor remedial pesticide application training for the pest control technician.

That is, by tracking/monitoring the time needed to complete a certain type of pesticide application job (i.e., treating a site 300), the computer device 900 is configured to determine distribution statistics for "normal application time" and can automatically flag or highlight individual pesticide dispensing unit(s) 800 and the pest control technician(s) associated therewith that are statistical outliers from the normal distribution statistic for the time required to complete a pesticide application job. In turn, PCO managers can use this information in planning and scheduling of resources (pest control technicians) on the basis of application efficiency to more accurately allocate work among pest control technicians. In other instances, by tracking the time needed to complete a certain type of pesticide application job, the computer device 900 may be configured to automate pricing for the pesticide application job, for example, via a pricing estimation based on the normal time/duration distribution, which, in turn can be used for customer billing purposes.

In particular aspects, the computer device 900 is configured to identify pest control technicians who are faster or slower in completing a particular pesticide application job type than the normal time/duration distribution, and can automatically direct those non-conforming pest control technicians, for example, to on-line video training modules that help improve consistency with established best practices with such pesticide application jobs. In addition, the computer device 900 may also be configured track or monitor compliance of those pest control technicians with the remedial training, and further to correlate this completion of remedial training with any subsequent change in the performance of the pest control technician with respect to duration of a pesticide application job. Any improvement in performance by the pest control technician can thus be commended, or additional training can be recommended if the pest control technician's performance has not improved. In addition, the computer device 900 can be configured to identify any pest control technician who under-apply or over-apply (overall usage or application rate) pesticide products compared to respective normal usage distribution statistics, and can automatically direct those non-conforming pest control technicians, for example, to on-line video training modules that help improve consistency with established best practices with application of such pesticide products. In addition, the computer device 900 can be configured to track or monitor compliance of those pest control technicians with the remedial training, and further to correlate this completion of remedial training with any subsequent change in pesticide product usage or application rate. Any improvement in performance by the pest control technician can thus be commended, or additional training can be recommended if the pest control technician's performance has not improved.

In other aspects, the computer device 900 is configured to correlate data from environmental monitors associated with the site 300, physical factors data associated with the site 300, data from facility monitors associated with the site 300, data associated with operation factors associated with the site 300, or external environmental factor data associated with external environmental factors affecting the site 300, with the determined usage of the pesticide substance. That is, the computer device 900 may be configured to track or monitor detected pest activity across many different types of sites. This detected pest activity can then be correlated with operational cycles (i.e., factors internal to the operation of the site) and/or seasonal/weather patterns affecting the site 300 (i.e., factors external to the site) to produce predictive analytics with respect to various pests. The computer device 900 may also be configured to provide alerts to site managers or PCO managers when a particular site type is trending toward or will have upcoming occurrences/events conducive to an increased level of pest activity, so that appropriate measures can be taken to prevent a problematic pest infestation. Still further, the computer device 900 can be configured to recommend best site/PCO management practices that can be implemented to prevent and/or solve the predicted pest infestation. Furthermore, by the computer device 900 automatically correlating site location and weather information about the site, with pesticide product usage histories, compliance records for the site may be readily generated efficiently addressing regulatory inquiries and/or any routine queries on site safety and/or environmental issues about the site, without requiring warehousing and sorting through paper records.

In additional instances, the computer device 900 is configured to determine a weather forecast associated with the site 300 or the location thereof, and to direct the pesticide dispensing unit 800, the associated pest control technician, or the site manager to refrain from dispensing the pest treatment at the site 300, if the weather forecast includes a weather event contraindicating dispensation of the pest treatment. That is, certain pesticides, such as pyrethroid insecticides, include instructions advising that the product not be applied if rain is forecast about the site within a 24 hour period of application. In such instances, the computer device 900 may be configured to consult a weather forecasting service to obtain an appropriate forecast for a site location, and correlate the appropriate weather forecast with real-time information regarding a pest control technician/pesticide dispensing unit 800 dispatched to the site. Accordingly, the computer device 900 can issue an alert to the site manager, the pest control technician, or to the pesticide dispensing unit 800, itself, that the usage or application of a particular pesticide product is contraindicated at the present time due to recommended application instructions.

On a broader basis, the computer device 900 may be configured to allow the site manager and/or the PCO manager to prevent a pest control technician from using or applying a particular pesticide product, for example, if applying the pesticide substance would be contraindicated by pesticide application guidelines, if applying the pesticide substance would be in violation of applicable local rules or governing laws, and/or to facilitate compliance with applicable environmental stewardship guidelines associated with the site. That is, notwithstanding federal approval for a particular pesticide product, private companies/sites often establish approved product lists so as to regulate what pesticide products can be used in association with a particular site. By correlating location information of a pesticide dispensing unit 800 and the pesticide substance to be dispensed thereby, with a directory of approved pesticide product for the site/location, the computer device 900 is configured to automatically alert/notify the pest control technician or site manager of the same, before an unapproved product is used, thereby ensuring compliance with particular site policies or laws or regulations affecting the site.

In various aspects of the present disclosure, a geospatial location module 880 (i.e., a GPS enabled device as shown, for example, in FIG. 8) is engaged with each of the one or more pesticide dispensing units 800. In such instances, the computer device 900 is configured to correlate a location of the site 300 with locations of the pesticide dispensing units 800 determined from the respective geospatial location module 880 (as well as the location of the associated pest control technician), as transmitted to the computer device 900 via the transmitter module 850. The computer device 900 may further be configured to dispatch the pest control technician, associated with the pesticide dispensing unit 800 closest to the location of the site 300, to the site 300 to dispense the pest treatment. That is, by having access to location data for the pesticide dispensing unit 800/the pest control technician, by way of the respective geospatial location module 880, the computer device 900 can automatically route alerts/notifications of detected pest activity received from a site to the pesticide dispensing unit 800/pest control technician closest to the site 300 so as to, for example, minimize response time and optimize labor utilization. Also, upon collection of sufficient data, the computer device 900 can be adaptable to sort alerts/notifications by severity or importance of the detected pest activity at various sites, and to dispatch certain resources (i.e., on-site personnel or resources) to respond to less serious detected pest problems, while escalating to dispatching particular pest control technicians from the PCO for more serious detected pest problems.

In addition, by having access to location data for the pesticide dispensing unit 800/the pest control technician, by way of the respective geospatial location module 880, the computer device 900 may be configured to determine the locations of the pesticide dispensing units 800 from the respective geospatial location module 880, to compare the location of any one of the pesticide dispensing units 800 to pest treatment restrictions for the location, and to designate an alternate pest treatment if the designated pest treatment conflicts with the pest treatment restrictions for the location.

In particular aspects, the pesticide module 880 of the respective pesticide dispensing unit 800 is configured to monitor consumption of the pesticide substance 840 housed thereby and to transmit associated consumption data to the computer device 900 via the transmitter module 850. In such instances, the computer device 900 is configured to analyze the consumption data to determine a usage rate for the pesticide substance 840 in the pesticide module 830, an ordering interval for a replacement pesticide module to replace the pesticide module 830 upon depletion of the pesticide substance 840 housed thereby, a retrieving interval for retrieving the pesticide module 830 upon depletion of the pesticide substance 840 housed thereby, or an inventory level of the pesticide modules 830 required to provide expedient replacement of the pesticide module 830 upon depletion of the pesticide substance 840 housed thereby. That is, the computer device 900 may be configured, for example, to create a verifiable record for each individual pest control technician/pesticide dispensing unit 800, so as to provide an accurate record of the pesticide product(s) being applied, the quantity or application rate thereof, the site location, and the date(s) of application. The computer device 900 is thus capable of monitoring and reporting exposure to certain pesticide product(s) for occupational health compliance (i.e., environmental exposure). In this regard, one possible advantage or benefit to the aspects of the pesticide dispensing unit 800 disclosed herein is, for example, that the automated and closed/contained formation of the pest treatment through mixing the pesticide substance 840 from the pesticide module 830 with the diluent 820 from the reservoir 810, reduces exposure of the pest control technician and/or the proximate public to the pesticide substance 840 which may be in concentrated form.

In particular aspects, the computer device 900 is configured to compare the consumption data, for example, regarding the usage amount or rate of the pesticide substance 840 in the various pesticide modules 830, to an inventory of pesticide modules 830 housing the pesticide substance 840 and pesticide modules depleted of the pesticide substance, to generate audit data (i.e., for tracking the pesticide modules 830 and overall consumption of the pesticide product(s)).

By generating real-time data on consumption of the pesticide product(s), with data on purchase volumes of the pesticide product(s), the computer device 900 may be configured to monitor inventories available at distinct levels: within the company (i.e., PCO), individual branch locations, or within every service vehicle. Supply chain logistics can thus be optimized, enabling automatic inventory replenishment that get the right pesticide product(s) to the right pest control technician(s) in the right quantities on a "just in time" basis. In addition, by tracking/monitoring pesticide product usage and/or usage rates (i.e., depletion), the computer device 900 can automatically schedule retrieval or empty/depleted pesticide modules 830 for recycling or replacement. Moreover, by correlating pesticide product supply (inventory) with pesticide product depletion, the computer device 90 may be configured to monitor for any discrepancies in the pesticide product(s) and generate stewardship alerts for possible misappropriated/stolen/ misplaced pesticide product(s) in response to any discovered discrepancies. In other instances, such discrepancies may indicate, for example, that calibration of the various pesticide dispensing units 800 may be needed.

In still other aspects of the present disclosure, the computer device 900 is configured to determine supply chain information associated with the pesticide module 830 housing the pesticide substance 840, and to compare the supply chain information to pest detection information associated with the site 300 to monitor pesticide substance product quality or pesticide substance performance metrics. That is, through access to product supply databases, identifying batch, assay, supplier, etc. information associated with various pesticide products, the computer device 900, also performing analysis on pest detection occurrences at the site 300, is configured to determine pesticide product quality issues or performance/efficacy problems. As a result, alerts/notifications can be promptly issued to handle any product recalls that may be necessary.

EXAMPLE 2

Figure 9:
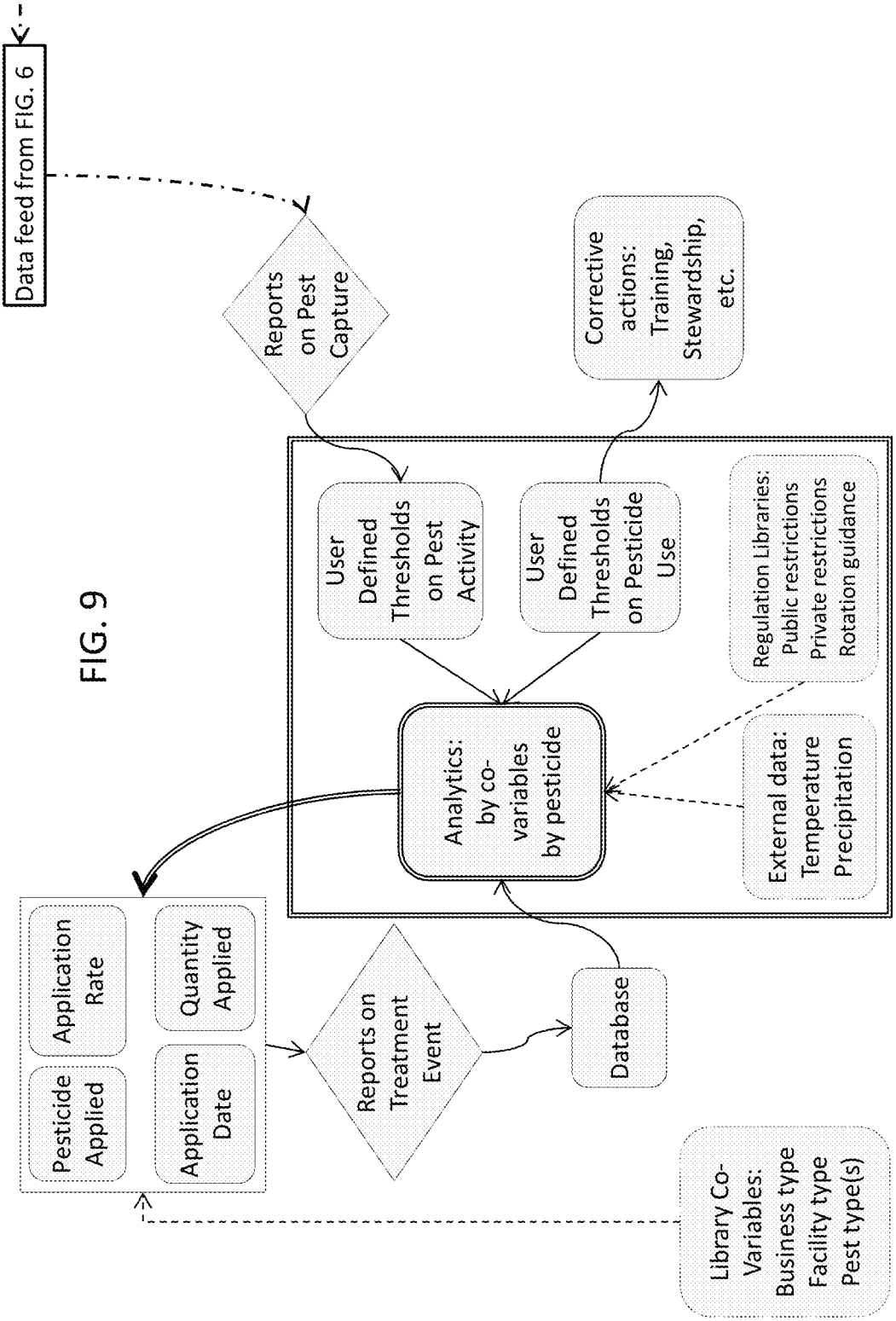
FIG. 9 is a schematic of an exemplary implementation of a pesticide application system to optimize pesticide usage and handling at a site in relation to actual data collected from the site, according to one aspect of the present disclosure discussed in Example 2.

FIG. 9 is a schematic illustration of an exemplary implementation of a pesticide application system to optimize pesticide usage and handling at a site in relation to actual data collected from the site, according to one aspect of the present disclosure. That is, in this example, the system is deployed to optimize pest management, in particular the application of pesticide formulations at a site to mitigate pest incidence in a facility, private residence or multi-unit residence.

An account generally includes one or more sites, with each site being serviced by the system being tagged with descriptive features for a facility, such as the nature of the business, its location, the facility size, and/or the type(s) of pests encountered. At every service at each site, the characteristics of the pesticide application event are recorded, such as the date a particular pesticide was applied, as well as the particular concentration and volume of that particular pesticide. This treatment event record of the pesticide application is logged into a database for analysis. Diverse analytics are performed on the accumulated treatment events.

In one example, external databases are accessed to retrieve temperature and precipitation events at the site, and this data can be correlated with the frequency of treatment events to learn how weather effects the persistence/efficacy of a particular pesticide used and applied at the site. The system can be configured to consult various 'libraries' that summarize governmental or private restrictions on when or where a particular pesticide can be used, and can send alerts to a technician (via a connected pesticide application device) to prevent unintentional violations from negatively affecting the compliance record of the pest management firm.

A pest management firm may establish a priori thresholds, or conduct a posteriori analysis of treatment events, to flag outliers in treatment events where corrective action is required. For example, by tracking pesticide applications by all of their technicians, the pest management firm can establish thresholds of application volume or even service time (i.e., by arithmetic mean plus or minus one standard deviation). The pest control firm can then identify technicians who are applying too much of pesticide or technicians who are not spending enough time to properly service the facility/site. With this insight, the pest control firm can direct technicians to training resources to ensure compliance with company standards of service or industry standard practice, for example, based on analysis of pesticide treatment records for similar facilities/sites associated with a multitude of other companies whose data is in the master database.

Finally, and in response to an interface with the optimized pest monitoring distribution arrangement disclosed in relation to Example 1, user-defined thresholds may be established for pest incidence that signals the need for a pesticide treatment at a facility/site. Upon the pest detection system of Example 1 reporting pest incidence above such thresholds, the optimized pest management system can generate an alert notifying the technician or pest management firm of the need for an additional pesticide application service at the facility/site.

The "need for service" alert may be modified in different manners. For example, a particular pesticide product may be recommended if the time period since the last pesticide application service is shorter than expectation (i.e., a shorter interval based on manufacturer-recommended treatment). Based on records of the instant pest management firm, or from a multitude of other similarly-situated pesticide management firms, the expected effective duration of pest suppression following a pesticide treatment can be established (i.e., by the arithmetic mean plus or minus one standard deviation). Deviation from this threshold could be suggestive of poor performance, either by the technician, the pesticide chemical, or both.

Additionally, to forestall development of physiological resistance in a pest population to a particular pesticide, a scheduled rotation may be established between or among different pesticides. The system thus keeps track of sequential use of one pesticide within a facility/at a site and then recommends the next pesticide product to be used in the management scheme for preventing pesticide resistance in the targeted pests. Poor performance outside of a normative result can also serve as an alert to a risk for pest resistance development to the pesticide, or to other conditions that reduce the effectiveness of the pesticide.

The system can thus be used to regulate pesticide application events, in the frequency or quality, by delivery data insights. Further, via interactions with pest alerts determined by an associated pest monitoring system, the system can optimize pest management in a facility/ at a site by minimizing the expense and risk associated with pesticide treatments, while keeping pest incidence within acceptable limits set for the facility/site.

Aspects of the present disclosure also provide methods performed by the disclosed and claimed systems, as shown generally in the operational flow diagrams of FIGS. 8 and 9, and as discussed throughout the disclosure herein. In addition to providing appropriate systems, apparatuses, and methods, aspects of the present disclosure may also provide associated non-transitory computer-readable storage mediums each having computer-readable program code stored therein that, in response to execution by a processor, causes an apparatus to at least perform the methods disclosed herein. That is, computer program product(s) for performing the functions/operations/steps disclosed above, in the form of, for example, a non-transitory computer-readable storage medium (i.e., memory device) having particular computer-readable program code portions stored therein by the medium that, in response to execution by the processor device, cause the apparatus to at least perform the steps disclosed herein.

Figure 10:
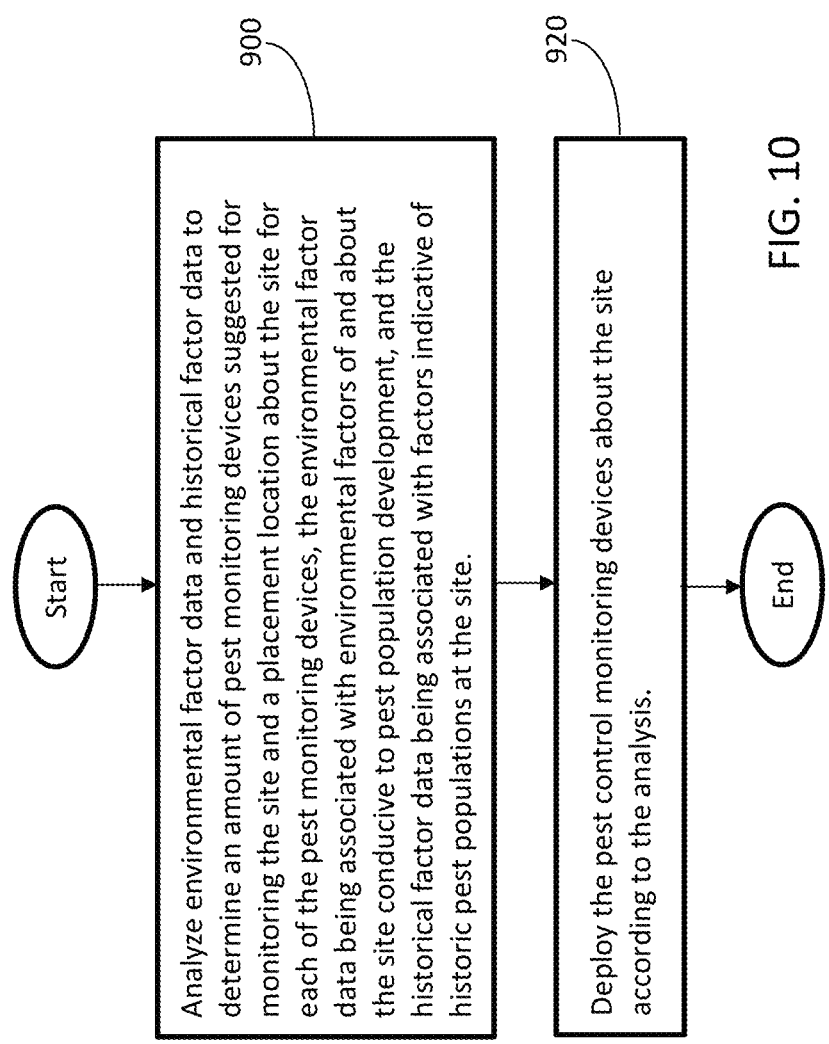
FIG. 10 is an operation flow diagram of a method of pest monitoring and control at a site, according to one aspect of the present disclosure.

In this regard, FIGS. 8 and 9 are operational flow diagrams associated with particular methods, systems, apparatuses and computer program products according to particular aspects of the present disclosure. More particularly, FIG. 10 schematically illustrates a method of pest monitoring and control at a site, according to one aspect of the present disclosure, comprising analyzing environmental factor data and historical factor data to determine an amount of pest monitoring devices suggested for monitoring the site and a placement location about the site for each of the pest monitoring devices, the environmental factor data being associated with environmental factors of and about the site conducive to pest population development, and the historical factor data being associated with factors indicative of historic pest populations at the site (Block 900); and deploying the pest control monitoring devices about the site according to the analysis (Block 920). FIG. 11 schematically illustrates an operation flow diagram of a method of pesticide application at a site, comprising receiving pesticide substance usage data at a computer device comprising a processor and a non-transitory memory storing executable instructions, from one or more remotely disposed pesticide dispensing units, each pesticide dispensing unit including a reservoir configured to house a diluent, a pesticide module configured to house a pesticide substance, and a transmitter module configured to transmit the data therefrom (Block 940); and determining and monitoring usage of the pesticide substance by analyzing the pesticide substance usage data with the computer device, the pesticide substance usage data including an amount or a rate of the pesticide substance dispensed from the pesticide module of any of the pesticide dispensing units to form a pest treatment having a concentration of the pesticide substance in the diluent, with the pest treatment being dispensed from the pesticide dispensing unit to treat a pest at the site (Block 960).

It will be understood that each block or step of each operational flow diagram or combinations of blocks in the operational flow diagram can be implemented by appropriate computer program instructions executed by the processor device. These computer program instructions may be loaded onto a computer device or other programmable apparatus for executing the functions specified in the operational flow diagram otherwise associated with the method(s) disclosed herein. These computer program instructions may also be stored in a non-transitory computer-readable memory (i.e., memory device), so as to be accessible by a computer device or other programmable apparatus in a particular manner, such that the executable instructions stored in the computer-readable memory may produce or facilitate the operation of an article of manufacture capable of directing or otherwise executing the instructions which implement the functions specified in the operational flow diagram otherwise associated with the method(s) disclosed herein. The computer program instructions may also be loaded onto a computer device or other programmable apparatus to cause a series of operational steps to be performed on the computer device or other programmable apparatus to produce a computer-implemented process such that the instructions executed by the computer device or other programmable apparatus provide or otherwise direct appropriate steps for implementing the functions/steps specified in the operational flow diagram otherwise associated with the method(s) disclosed herein. It will also be understood that each step of the operational flow diagram, or combinations of steps in the operational flow diagram, can be implemented by special purpose hardware-based computer systems which perform the specified functions or steps, or combinations of special purpose hardware and computer instructions (software).

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a non-transitory computer-readable storage medium to produce a particular machine, such that the particular machine becomes a basis for implementing the functions specified herein. These program code instructions may also be stored in a non-transitory computer-readable storage medium that can direct a computer, a processing circuitry or other programmable apparatus to function in a particular manner to thereby generate a particular machine or particular article of manufacture. The instructions stored in the non-transitory computer-readable storage medium may produce an article of manufacture, where the article of manufacture becomes a means for implementing functions described herein. The program code instructions may be retrieved from a non-transitory computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a non-transitory computer-readable storage medium, supports combinations of operations for performing the specified functions. In this manner, an apparatus may include processing circuitry and a non-transitory computer-readable storage medium or memory coupled to the processing circuitry, where the processing circuitry is configured to execute computer-readable program code stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. For example, in particular aspects, historical data of site treatment protocols and pest detection incidences may be used to perform analytics directed to various business performance metrics (e.g., account retention factors, satisfaction surveys) such that management can use these insights to optimize customer satisfaction and improve business growth and profitability. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A pest monitoring and control system, comprising:
   a plurality of pest monitoring devices each configured for placement at a site and to generate a signal in response to detection of a pest at the site;
   a computer device remotely disposed with respect to the pest monitoring devices and configured to be in communication therewith so as to receive the generated signals therefrom, the signals from the pest monitoring devices comprising actual site data, the computer device comprising a processor and a memory storing executable instructions that, in response to execution by the processor, cause the computer device to at least:
   analyze environmental factor data and historical factor data to determine an amount of the pest monitoring devices suggested for monitoring the site and a placement location about the site for each of the pest monitoring devices, the environmental factor data being associated with environmental factors of and about the site conducive to pest population development, and the historical factor data being associated with factors indicative of historic pest populations at the site; and
   direct deployment of the pest control monitoring devices about the site according to the analysis.

2. The system of claim 1, wherein, in response to detection of a pest by any of the pest monitoring devices, the computer device is configured to analyze the actual site data to determine a location or a potential source of the detected pest about the site.

3. The system of claim 2, wherein, in response to detection of a pest by any of the pest monitoring devices, the computer device is configured to analyze the actual site data to determine a vector indicating the location or the potential source of the detected pest about the site.

4. The system of claim 1, wherein the computer device is configured to analyze the actual site data with the environmental factor data and the historical factor data to determine whether the placement location of the pest monitoring devices about the site should be altered or whether the amount of the pest monitoring devices deployed about the site should be altered.

5. The system of claim 1, wherein the computer device is configured to direct modulation of at least the amount of pest monitoring devices deployed about the site based on a risk tolerance factor.

6. The system of claim 1, wherein the computer device is configured to analyzing the environmental factor data and the historical factor data to determine the amount of pest monitoring devices suggested for monitoring the site and the placement location about the site for each of the pest monitoring devices with respect to a geospatial map of the site.

7. The system of claim 2, wherein the computer device is configured to designate a remedy for the detected pest or the potential source thereof at the site.

8. The system of claim 1, wherein the computer device is configured to direct one or more identification inquiries to a remote terminal in response to the actual site data, the remote terminal being configured to receive responses to the one or more identification inquiries input therein from the site and to direct the responses to the computer device, the computer device being responsive to the responses from the remote terminal to identify the detected pest and designate a remedy for the detected pest or the source thereof at the site.

9. The system of claim 2, wherein the computer device is configured to direct a remedy for the detected pest or the potential source thereof at the site to a pesticide dispenser configured to effectuate the remedy at the site or to a pest control technician directed to effectuate the remedy at the site.

10. The system of claim 2, wherein the computer device is configured to analyze the actual site data in comparison to operational activity data associated with operational activity factors at the site or external environmental factor data associated with external environmental factors affecting the site, to forecast a future pest infestation event.

11. The system of claim 10, wherein the computer device is configured to determine changes in operational activity factors associated with the operational activity data, changes in environmental factors associated with the environmental factor data, or preventative factors for counteracting the forecasted future pest infestation event.

12. The system of claim 2, wherein the computer device is configured to analyze data from environmental monitors associated with the site, physical factors data associated with the site, data from facility monitors associated with the site, or data associated with operation factors associated with the site, to determine any correlation thereof with the actual site data so as to identify a root cause of a pest infestation at the site or recommend measures for preventing a future pest infestation.

13. The system of claim 7, wherein the computer device is configured to vary the designated remedy or an active ingredient of the designated remedy for the detected pest or the potential source thereof at the site so as to prevent or delay development of resistance to the remedy or the active ingredient of the designated remedy by the detected pest.

14. The system of claim 7, wherein the computer device is configured to correlate actual site data with the designated remedy for the detected pest or the potential source thereof at the site so as to determine any change in pest activity in response to the designated remedy or to rate effectiveness of the designated remedy according to the pest activity being treated.

15. The system of claim 7, wherein the computer device is configured to analyze the actual site data to determine whether pest activity associated therewith is increasing, in relation the designated remedy or effectuation parameters associated therewith, to recommend further remedial action and wherein the further remedial action includes adjusting the effectuation parameters within a recommended range, addressing site factors not associated with the effectuation parameters, and altering the designated remedy or an active ingredient of the designated remedy so as to prevent or delay development of resistance to the remedy by the detected pest.

16. The system of claim 7, wherein the computer device is configured to compare the designated remedy to remedy restrictions for the site, and to designate an alternate remedy if the designated remedy conflicts with the remedy restrictions.

17. A method of pest monitoring and control at a site, comprising:
analyzing environmental factor data and historical factor data to determine an amount of pest monitoring devices suggested for monitoring the site and a placement location about the site for each of the pest monitoring devices, the environmental factor data being associated with environmental factors of and about the site conducive to pest population development, and the historical factor data being associated with factors indicative of historic pest populations at the site; and
deploying the pest control monitoring devices about the site according to the analysis.

18. The method of claim 17, wherein each pest monitoring device is configured to generate a signal in response to detection of a pest at the site and to transmit the signal to a remotely-disposed computer device, and wherein the method comprises analyzing the signals from any of the pest monitoring devices using the computer device to determine a location or a potential source of the detected pest about the site, the signals from the pest monitoring devices comprising actual site data.

19. The method of claim 18, comprising analyzing the actual site data to determine a vector indicating the location or the potential source of the detected pest about the site.

20. The method of claim 18, comprising analyzing the actual site data with the environmental factor data and the historical factor data to determine whether the placement location of the pest monitoring devices about the site should be altered or whether the amount of the pest monitoring devices deployed about the site should be altered.

21. The method of claim 17, comprising directing modulation of at least the amount of pest monitoring devices deployed about the site based on a risk tolerance factor.

22. The method of claim 17, wherein analyzing the environmental factor data and the historical factor data to determine the amount of pest monitoring devices suggested for monitoring the site and the placement location about the site for each of the pest monitoring devices is performed with respect to a geospatial map of the site.

23. The method of claim 18, comprising designating, by the computer device, a remedy for the detected pest or the potential source thereof at the site.

24. The method of claim 18, comprising directing one or more identification inquiries from the computer device to a remote terminal in response to the actual site data, the remote terminal being configured to receive responses to the one or more identification inquiries input therein from the site.

25. The method of claim 24, comprising receiving the responses at the computer device, the computer device being responsive to the responses from the remote terminal to identify the detected pest, and designating, by the computer device, a remedy for the detected pest or the source thereof at the site.

26. The method of claim 18, comprising directing a remedy for the detected pest or the potential source thereof at the site from the computer device to a pesticide dispenser configured to effectuate the remedy at the site or to a pest control technician directed to effectuate the remedy at the site.

27. The method of claim 18, comprising forecasting a future pest infestation event by analyzing, with the computer device, the actual site data in comparison to operational activity data associated with operational activity factors at the site or external environmental factor data associated with external environmental factors affecting the site.

28. The method of claim 27, comprising determining, with the computer device, changes in operational activity factors associated with the operational activity data, changes in environmental factors associated with the environmental factor data, or preventative factors for counteracting the forecasted future pest infestation event.

29. The method of claim 18, comprising identifying a root cause of a pest infestation at the site or recommending measures for preventing a future pest infestation, with the computer device, by analyzing data from environmental monitors associated with the site, physical factors data associated with the site, data from facility monitors associated with the site, or data associated with operation factors associated with the site, to determine any correlation thereof with the actual site data.

30. The method of claim 23, comprising preventing or delaying development of resistance to the remedy or an active ingredient of the designated remedy by the detected pest by varying, with the computer device, the designated remedy or the active ingredient of the designated remedy for the detected pest or the potential source thereof at the site.

31. The method of claim 23, comprising correlating, with the computer device, actual site data with the designated remedy for the detected pest or the potential source thereof at the site so as to determine any change in pest activity in response to the designated remedy or to rate effectiveness of the designated remedy according to the pest activity being treated.

32. The method of claim 23, comprising recommending further remedial action by analyzing the actual site data, with the computer device, to determine whether pest activity associated therewith is increasing, in relation the designated remedy or effectuation parameters associated therewith, wherein the further remedial action includes adjusting the effectuation parameters within a recommended range, addressing site factors not associated with the effectuation parameters, and altering the designated remedy so as to prevent or delay development of resistance to the remedy or an active ingredient of the designated remedy by the detected pest.

33. The method of claim 23, comprising comparing, with the computer device, the designated remedy to remedy restrictions for the site, and designating an alternate remedy if the designated remedy conflicts with the remedy restrictions.

34. A computer-readable storage medium for a pest control monitoring and control system at a site, the computer-readable storage medium being non-transitory and having computer-readable program code stored therein that, in response to execution by a processor, causes an apparatus to at least:

analyze environmental factor data and historical factor data to determine an amount of pest monitoring devices suggested for monitoring the site and a placement location about the site for each of the pest monitoring devices, the environmental factor data being associated with environmental factors of the site conducive to pest population development, and the historical factor data being associated with factors indicative of historic pest populations at the site; and deploy the pest control monitoring devices about the site according to the analysis.

35. The non-transitory computer-readable storage medium of claim 34, wherein each pest monitoring device is configured to generate a signal in response to detection of a pest at the site and to transmit the signal to a remotely-disposed computer device having the non-transitory computer-readable storage medium associated therewith, and wherein the non-transitory computer-readable storage medium includes further computer-readable program code stored therein that in response to execution by the processor, causes the apparatus to analyze the signals from the pest monitoring devices to determine a location or a potential source of the detected pest about the site, the signals from the pest monitoring devices comprising actual site data.

36. The non-transitory computer-readable storage medium of claim 35, including further computer-readable program code stored therein that in response to execution by the processor, causes the apparatus to analyze the actual site data to determine a vector indicating the location or the potential source of the detected pest about the site.

37. The non-transitory computer-readable storage medium of claim 35, including further computer-readable program code stored therein that in response to execution by the processor, causes the apparatus to analyze the actual site data with the environmental factor data and the historical factor data to determine whether the placement location of the pest monitoring devices about the site should be altered or whether the amount of the pest monitoring devices deployed about the site should be altered.

38. The non-transitory computer-readable storage medium of claim 34, including further computer-readable program code stored therein that in response to execution by the processor, causes the apparatus to direct modulation of at least the amount of pest monitoring devices deployed about the site based on a risk tolerance factor.

39. The non-transitory computer-readable storage medium of claim 34, including further computer-readable program code stored therein that in response to execution by the processor, causes the apparatus to analyze the environmental factor data and the historical factor data to determine the amount of pest monitoring devices suggested for monitoring the site and the placement location about the site for each of the pest monitoring devices with respect to a geospatial map of the site.

40. The non-transitory computer-readable storage medium of claim 35, including further computer-readable program code stored therein that in response to execution by the processor, causes the apparatus to designate a remedy for the detected pest or the potential source thereof at the site.

41. The non-transitory computer-readable storage medium of claim 35, including further computer-readable program code stored therein that in response to execution by the processor, causes the apparatus to direct one or more identification inquiries from the computer device to a remote terminal in response to the actual site data, the remote terminal being configured to receive responses to the one or more identification inquiries input therein from the site.

42. The non-transitory computer-readable storage medium of claim 41, including further computer-readable program code stored therein that in response to execution by the processor, causes the apparatus, in response to receipt of the responses from the remote terminal, to identify the detected pest, and designate a remedy for the detected pest or the source thereof at the site.

43. The non-transitory computer-readable storage medium of claim 35, including further computer-readable program code stored therein that in response to execution by the processor, causes the apparatus to direct a remedy for the detected pest or the potential source thereof at the site from the computer device to a pesticide dispenser configured to effectuate the remedy at the site or to a pest control technician directed to effectuate the remedy at the site.

44. The non-transitory computer-readable storage medium of claim 35, including further computer-readable program code stored therein that in response to execution by the processor, causes the apparatus to forecast a future pest infestation event by analyzing the actual site data in comparison to operational activity data associated with operational activity factors at the site or external environmental factor data associated with external environmental factors affecting the site.

45. The non-transitory computer-readable storage medium of claim 44, including further computer-readable program code stored therein that in response to execution by the processor, causes the apparatus to determine changes in operational activity factors associated with the operational activity data, changes in environmental factors associated with the environmental factor data, or preventative factors for counteracting the forecasted future pest infestation event.

46. The non-transitory computer-readable storage medium of claim 35, including further computer-readable program code stored therein that in response to execution by the processor, causes the apparatus to identify a root cause of a pest infestation at the site or recommend measures for preventing a future pest infestation, by analyzing data from environmental monitors associated with the site, physical factors data associated with the site, data from facility monitors associated with the site, or data associated with operation factors associated with the site, to determine any correlation thereof with the actual site data.

47. The non-transitory computer-readable storage medium of claim 40, including further computer-readable program code stored therein that in response to execution by the processor, causes the apparatus to prevent or delay development of resistance to the remedy or an active ingredient of the designated remedy by the detected pest by varying the designated remedy or the active ingredient of the designated remedy for the detected pest or the potential source thereof at the site.

48. The non-transitory computer-readable storage medium of claim 40, including further computer-readable program code stored therein that in response to execution by the processor, causes the apparatus to correlate actual site data with the designated remedy for the detected pest or the potential source thereof at the site so as to determine any change in pest activity in response to the designated remedy or to rate effectiveness of the designated remedy according to the pest activity being treated.

49. The non-transitory computer-readable storage medium of claim 40, including further computer-readable program code stored therein that in response to execution by the processor, causes the apparatus to recommend further remedial action by analyzing the actual site data to determine whether pest activity associated therewith is increasing, in relation the designated remedy or effectuation parameters associated therewith, wherein the further remedial action includes adjusting the effectuation parameters within a recommended range, addressing site factors not associated with the effectuation parameters, and altering the designated remedy or an active ingredient of the designated remedy so as to prevent or delay development of resistance to the remedy by the detected pest.

50. The non-transitory computer-readable storage medium of claim 40, including further computer-readable program code stored therein that in response to execution by the processor, causes the apparatus to compare the designated remedy to remedy restrictions for the site, and designate an alternate remedy if the designated remedy conflicts with the remedy restrictions.

51. A pesticide application system, comprising:
one or more pesticide dispensing units, each pesticide dispensing unit including a reservoir configured to house a diluent, a pesticide module configured to house a pesticide substance, and a transmitter module configured to transmit data therefrom; and
a computer device remotely disposed with respect to the pesticide dispensing units and configured to receive pesticide substance usage data therefrom via the respective transmitter module, the pesticide substance usage data including an amount or a rate of the pesticide substance dispensed from the pesticide module of any of the pesticide dispensing units to form a pest treatment having a concentration of the pesticide substance in the diluent, the pest treatment being dispensed from the pesticide dispensing unit to treat a pest at the site, and the computer device comprising a processor and a memory storing executable instructions that, in response to execution by the processor, cause the computer device to at least determine and monitor usage of the pesticide substance.

52. The system of claim 51, wherein the one or more pesticide dispensing units comprises a plurality of pesticide dispensing units, and wherein the computer device is configured to determine usage of the pesticide substance based on the amount or the rate thereof dispensed from the pesticide modules of the pesticide dispensing units.

53. The system of claim 52, wherein the computer device is configured to determine a normal usage distribution statistic for the pesticide substance dispensed from one or more of the pesticide dispensing units.

54. The system of claim 53, wherein the computer device is configured to compare the determined usage of the pesticide substance from any of the pesticide dispensing units to the normal usage distribution statistic to determine any of the pesticide dispensing units dispensing more than or less than the normal usage distribution statistic for the pesticide substance.

55. The system of claim 54, wherein each pesticide dispensing unit is associated with a pest control technician, and wherein, in response to the determined usage of the pesticide substance from any of the pesticide dispensing units being outside the normal usage distribution statistic, the computer device is configured to determine remedial pesticide application training for the pest control technician.

56. The system of claim 51, wherein the one or more pesticide dispensing units each comprise a timer module in communication with the transmitter module, the timer module being configured to determine a duration of a pesticide application event, and wherein the computer device is configured to determine a normal duration distribution statistic for a plurality of the pesticide application events.

57. The system of claim 56, wherein the computer device is configured to compare the determined duration of the pesticide application event from any of the pesticide dispensing units to the normal duration distribution statistic to determine any of the pesticide dispensing units being used for more than or less than the normal duration distribution statistic for the pesticide application events.

58. The system of claim 57, wherein each pesticide dispensing unit is associated with a pest control technician, and wherein, in response to the determined duration of the pesticide application event from any of the pesticide dispensing units being outside the normal duration distribution statistic, the computer device is configured to determine and monitor remedial pesticide application training for the pest control technician.

59. The system of claim 52, wherein the computer device is configured to correlate data from environmental monitors associated with the site, physical factors data associated with the site, data from facility monitors associated with the site, data associated with operation factors associated with the site, or external environmental factor data associated with external environmental factors affecting the site, with the determined usage of the pesticide substance.

60. The system of claim 51, wherein the one or more pesticide dispensing units each comprise a receiver module configured to receive communications from the computer device, and wherein the computer device is configured to direct at least the pesticide module of any of the pesticide dispensing units to meter the pesticide substance dispensed therefrom for forming a specified concentration of the pesticide substance in the diluent of the pest treatment to be dispensed from the pesticide dispensing unit.

61. The system of claim 51, wherein the computer device is configured to determine a weather forecast associated with the site, and to direct the pesticide dispensing unit to refrain from dispensing the pest treatment at the site, if the weather forecast includes a weather event contraindicating dispensation of the pest treatment.

62. The system of claim 51, comprising a geospatial location module engaged with each of the one or more pesticide dispensing units, wherein the computer device is configured to correlate a location of the site with locations of the pesticide dispensing units determined from the respective geospatial location module, and to dispatch a pest control technician, associated with the pesticide dispensing unit closest to the location of the site, to the site to dispense the pest treatment.

63. The system of claim 51, comprising a geospatial location module engaged with each of the one or more pesticide dispensing units, wherein the computer device is configured to determine the locations of the pesticide dispensing units from the respective geospatial location module, to compare the location of any one of the pesticide dispensing units to pest treatment restrictions for the location, and to designate an alternate pest treatment if the designated pest treatment conflicts with the pest treatment restrictions for the location.

64. The system of claim 51, wherein the pesticide module is configured to monitor consumption of the pesticide substance housed thereby and to transmit associated consumption data to the computer device via the transmitter module, and wherein the computer device is configured to analyze the consumption data to determine a usage rate for the pesticide substance in the pesticide module, an ordering interval for a replacement pesticide module to replace the pesticide module upon depletion of the pesticide substance housed thereby, a retrieving interval for retrieving the pesticide module upon depletion of the pesticide substance housed thereby, or an inventory level of the pesticide modules required to provide expedient replacement of the pesticide module upon depletion of the pesticide substance housed thereby.

65. The system of claim 64, wherein the computer device is configured to compare the consumption data to an inventory of pesticide modules housing the pesticide substance and pesticide modules depleted of the pesticide substance, to generate audit data.

66. The system of claim 64, wherein the computer device is configured to determine supply chain information associated with the pesticide module housing the pesticide substance, and to compare the supply chain information to pest detection information associated with the site to monitor pesticide substance product quality or pesticide substance performance metrics.

67. A method of pesticide application at a site, comprising:
receiving pesticide substance usage data at a computer device comprising a processor and a non-transitory memory storing executable instructions, from one or more remotely disposed pesticide dispensing units, each pesticide dispensing unit including a reservoir configured to house a diluent, a pesticide module configured to house a pesticide substance, and a transmitter module configured to transmit the data therefrom; and
determining and monitoring usage of the pesticide substance by analyzing the pesticide substance usage data with the computer device, the pesticide substance usage data including an amount or a rate of the pesticide substance dispensed from the pesticide module of any of the pesticide dispensing units to form a pest treatment having a concentration of the pesticide substance in the diluent, with the pest treatment being dispensed from the pesticide dispensing unit to treat a pest at the site.

68. The method of claim 67, wherein the one or more pesticide dispensing units comprises a plurality of pesticide dispensing units, and wherein the method comprises determining usage of the pesticide substance based on the amount or the rate of the pesticide substance dispensed from the pesticide modules of the pesticide dispensing units.

69. The method of claim 68, comprising determining a normal usage distribution statistic for the pesticide substance dispensed from one or more of the pesticide dispensing units.

70. The method of claim 69, comprising comparing the determined usage of the pesticide substance from any of the pesticide dispensing units to the normal usage distribution statistic to determine any of the pesticide dispensing units dispensing more than or less than the normal usage distribution statistic for the pesticide substance.

71. The method of claim 70, wherein each pesticide dispensing unit is associated with a pest control technician, and wherein the method comprises determining remedial pesticide application training for the pest control technician, in response to the determined usage of the pesticide substance from any of the pesticide dispensing units being outside the normal usage distribution statistic.

72. The method of claim 67, wherein the one or more pesticide dispensing units each comprise a timer module in communication with the transmitter module, the timer module being configured to determine a duration of a pesticide application event, and wherein the method comprises determining a normal duration distribution statistic for a plurality of the pesticide application events.

73. The method of claim 72, comprising comparing the determined duration of the pesticide application event from any of the pesticide dispensing units to the normal duration distribution statistic to determine any of the pesticide dispensing units being used for more than or less than the normal duration distribution statistic for the pesticide application events.

74. The method of claim 73, wherein each pesticide dispensing unit is associated with a pest control technician, and wherein the method comprises determining and monitoring remedial pesticide application training for the pest control technician, in response to the determined duration of the pesticide application event from any of the pesticide dispensing units being outside the normal duration distribution statistic.

75. The method of claim 68, comprising correlating data from environmental monitors associated with the site, physical factors data associated with the site, data from facility monitors associated with the site, data associated with operation factors associated with the site, or external environmental factor data associated with external environmental factors affecting the site, with the determined usage of the pesticide substance.

76. The method of claim 67, wherein the one or more pesticide dispensing units each comprise a receiver module configured to receive communications from the computer device, and wherein the method comprises directing at least the pesticide module of any of the pesticide dispensing units to meter the pesticide substance dispensed therefrom for forming a specified concentration of the pesticide substance in the diluent of the pest treatment to be dispensed from the pesticide dispensing unit.

77. The method of claim 67, comprising determining a weather forecast associated with the site, and directing the pesticide dispensing unit to refrain from dispensing the pest treatment at the site, if the weather forecast includes a weather event contraindicating dispensation of the pest treatment.

78. The method of claim 67, comprising a geospatial location module engaged with each of the one or more pesticide dispensing units, wherein the method comprises correlating a location of the site with locations of the pesticide dispensing units determined from the respective geospatial location module, and dispatching a pest control technician, associated with the pesticide dispensing unit closest to the location of the site, to the site to dispense the pest treatment.

79. The method of claim 67, comprising a geospatial location module engaged with each of the one or more pesticide dispensing units, wherein the method comprises determining the locations of the pesticide dispensing units from the respective geospatial location module, comparing the location of any one of the pesticide dispensing units to pest treatment restrictions for the location, and designating an alternate pest treatment if the designated pest treatment conflicts with the pest treatment restrictions for the location.

80. The method of claim 67, wherein the pesticide module is configured to monitor consumption of the pesticide substance housed thereby and to transmit associated consumption data to the computer device via the transmitter module, and wherein the method comprises analyzing the consumption data to determine a usage rate for the pesticide substance in the pesticide module, an ordering interval for a replacement pesticide module to replace the pesticide module upon depletion of the pesticide substance housed thereby, a retrieving interval for retrieving the pesticide module upon depletion of the pesticide substance housed thereby, or an inventory level of the pesticide modules required to provide expedient replacement of the pesticide module upon depletion of the pesticide substance housed thereby.

81. The method of claim 80, comprising comparing the consumption data to an inventory of pesticide modules housing the pesticide substance and pesticide modules depleted of the pesticide substance, to generate audit data.

82. The method of claim 80, comprising determining supply chain information associated with the pesticide module housing the pesticide substance, and comparing the supply chain information to pest detection information associated with the site, to monitor pesticide substance product quality or pesticide substance performance metrics.

83. A computer-readable storage medium for pesticide application at a site, the computer-readable storage medium being non-transitory and having computer-readable program code stored therein that, in response to execution by a processor, causes an apparatus to at least:
receive data at a computer device having the non-transitory computer-readable storage medium associated therewith, from one or more remotely disposed pesticide dispensing units, each pesticide dispensing unit including a reservoir configured to house a diluent, a pesticide module configured to house a pesticide substance, and a transmitter module configured to transmit the data therefrom; and
monitor usage of the pesticide substance by analyzing the data with the computer device, the data including an amount or a rate of the pesticide substance dispensed from the pesticide module of any of the pesticide dispensing units to form a pest treatment having a concentration of the pesticide substance in the diluent, with the pest treatment being dispensed from the pesticide dispensing unit to treat a pest at the site.

84. The non-transitory computer-readable storage medium of claim 83, wherein the one or more pesticide dispensing units comprises a plurality of pesticide dispensing units, and wherein the non-transitory computer-readable storage medium includes further computer-readable program code stored therein that in response to execution by the processor, causes the apparatus to determine usage of the pesticide substance based on the amount or the rate of the pesticide substance dispensed from the pesticide modules of the pesticide dispensing units.

85. The non-transitory computer-readable storage medium of claim 84, including further computer-readable program code stored therein that in response to execution by the processor, causes the apparatus to determine a normal usage distribution statistic for the pesticide substance dispensed from one or more of the pesticide dispensing units.

86. The non-transitory computer-readable storage medium of claim 85, including further computer-readable program code stored therein that in response to execution by the processor, causes the apparatus to compare the determined usage of the pesticide substance from any of the pesticide dispensing units to the normal usage distribution statistic to determine any of the pesticide dispensing units dispensing more than or less than the normal usage distribution statistic for the pesticide substance.

87. The non-transitory computer-readable storage medium of claim 86, wherein each pesticide dispensing unit is associated with a pest control technician, and wherein the non-transitory computer-readable storage medium includes further computer-readable program code stored therein that in response to execution by the processor, causes the apparatus to determine remedial pesticide application training for the pest control technician, in response to the determined usage of the pesticide substance from any of the pesticide dispensing units being outside the normal usage distribution statistic.

88. The non-transitory computer-readable storage medium of claim 83, wherein the one or more pesticide dispensing units each comprise a timer module in communication with the transmitter module, the timer module being configured to determine a duration of a pesticide application event, and wherein the non-transitory computer-readable storage medium includes further computer-readable program code stored therein that in response to execution by the processor, causes the apparatus to determine a normal duration distribution statistic for a plurality of the pesticide application events.

89. The non-transitory computer-readable storage medium of claim 88, including further computer-readable program code stored therein that in response to execution by the processor, causes the apparatus to compare the determined duration of the pesticide application event from any of the pesticide dispensing units to the normal duration distribution statistic to determine any of the pesticide dispensing units being used for more than or less than the normal duration distribution statistic for the pesticide application events.

90. The non-transitory computer-readable storage medium of claim 89, wherein each pesticide dispensing unit is associated with a pest control technician, and wherein the non-transitory computer-readable storage medium includes further computer-readable program code stored therein that in response to execution by the processor, causes the apparatus to determine and monitor remedial pesticide application training for the pest control technician, in response to the determined duration of the pesticide application event from any of the pesticide dispensing units being outside the normal duration distribution statistic.

91. The non-transitory computer-readable storage medium of claim 84, including further computer-readable program code stored therein that in response to execution by the processor, causes the apparatus to correlate data from environmental monitors associated with the site, physical factors data associated with the site, data from facility monitors associated with the site, data associated with operation factors associated with the site, or external environmental factor data associated with external environmental factors affecting the site, with the determined usage of the pesticide substance.

92. The non-transitory computer-readable storage medium of claim 83, wherein the one or more pesticide dispensing units each comprise a receiver module configured to receive communications from the computer device, and wherein the non-transitory computer-readable storage medium includes further computer-readable program code stored therein that in response to execution by the processor, causes the apparatus to direct at least the pesticide module of any of the pesticide dispensing units to meter the pesticide substance dispensed therefrom for forming a specified concentration of the pesticide substance in the diluent of the pest treatment to be dispensed from the pesticide dispensing unit.

93. The non-transitory computer-readable storage medium of claim 83, including further computer-readable program code stored therein that in response to execution by the processor, causes the apparatus to determine a weather forecast associated with the site, and direct the pesticide dispensing unit to refrain from dispensing the pest treatment at the site, if the weather forecast includes a weather event contraindicating dispensation of the pest treatment.

94. The non-transitory computer-readable storage medium of claim 83, comprising a geospatial location module engaged with each of the one or more pesticide dispensing units, wherein the non-transitory computer-readable storage medium includes further computer-readable program code stored therein that in response to execution by the processor, causes the apparatus to correlate a location of the site with locations of the pesticide dispensing units determined from the respective geospatial location module, and dispatch a pest control technician, associated with the pesticide dispensing unit closest to the location of the site, to the site to dispense the pest treatment.

95. The non-transitory computer-readable storage medium of claim 83, comprising a geospatial location module engaged with each of the one or more pesticide dispensing units, wherein the non-transitory computer-readable storage medium includes further computer-readable program code stored therein that in response to execution by the processor, causes the apparatus to determine the locations of the pesticide dispensing units from the respective geospatial location module, compare the location of any one of the pesticide dispensing units to pest treatment restrictions for the location, and designate an alternate pest treatment if the designated pest treatment conflicts with the pest treatment restrictions for the location.

96. The non-transitory computer-readable storage medium of claim 83, wherein the pesticide module is configured to monitor consumption of the pesticide substance housed thereby and to transmit associated consumption data to the computer device associated with the non-transitory computer-readable storage medium via the transmitter module, and wherein the non-transitory computer-readable storage medium includes further computer-readable program code stored therein that in response to execution by the processor, causes the apparatus to analyze the consumption data to determine a usage rate for the pesticide substance in the pesticide module, an ordering interval for a replacement pesticide module to replace the pesticide module upon depletion of the pesticide substance housed thereby, a retrieving interval for retrieving the pesticide module upon depletion of the pesticide substance housed thereby, or an inventory level of the pesticide modules required to provide expedient replacement of the pesticide module upon depletion of the pesticide substance housed thereby.

97. The non-transitory computer-readable storage medium of claim 96, including further computer-readable program code stored therein that in response to execution by the processor, causes the apparatus to compare the consumption data to an inventory of pesticide modules housing the pesticide substance and pesticide modules depleted of the pesticide substance, to generate audit data.

98. The non-transitory computer-readable storage medium of claim 96, including further computer-readable program code stored therein that in response to execution by the processor, causes the apparatus to determine supply chain information associated with the pesticide module housing the pesticide substance, and comparing the supply chain information to pest detection information associated with the site, to monitor pesticide substance product quality or pesticide substance performance metrics.

* * * * *